(12) United States Patent
Natarajan et al.

(10) Patent No.: US 10,664,281 B2
(45) Date of Patent: May 26, 2020

(54) APPARATUSES AND METHODS FOR DYNAMIC ASYMMETRIC SCALING OF BRANCH PREDICTOR TABLES

(71) Applicant: Intel Corporation, Santa Clara, CA (US)

(72) Inventors: Ragavendra Natarajan, Mysore (IN); Niranjan Soundararajan, Santa Clara, CA (US); Saurabh Gupta, Bengaluru (IN); Sreenivas Subramoney, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 7 days.

(21) Appl. No.: 16/147,670

(22) Filed: Sep. 29, 2018

(65) Prior Publication Data
US 2020/0104137 A1    Apr. 2, 2020

(51) Int. Cl.
*G06F 9/38*    (2018.01)
*G06F 9/30*    (2018.01)

(52) U.S. Cl.
CPC .......... *G06F 9/3806* (2013.01); *G06F 9/3848* (2013.01); *G06F 9/30145* (2013.01)

(58) Field of Classification Search
CPC .................................................. G06F 9/3848
See application file for complete search history.

(56) References Cited

U.S. PATENT DOCUMENTS

| 10,223,123 B1* | 3/2019 | Blasco | ................... G06F 1/3287 |
| 2015/0331691 A1* | 11/2015 | Levitan | ............... G06F 9/30058 |
| | | | 712/240 |

(Continued)

OTHER PUBLICATIONS

Intel® Architecture, "Instruction Set Extensions and Future Features Programming Reference," 319433-034, May 2018, 145 pages.

(Continued)

*Primary Examiner* — Jacob Petranek
(74) *Attorney, Agent, or Firm* — Nicholson De Vos Webster & Elliott LLP

(57) ABSTRACT

Methods and apparatuses relating to dynamic asymmetric scaling of branch predictor tables are described. Branch predictor circuits to perform dynamic asymmetric scaling of branch predictor tables are also described. In one embodiment, a processor includes an execution unit to execute a branch instruction; and a branch predictor to generate a prediction for the branch instruction from either of a plurality of global history prediction tables of differing history lengths and a floating global history prediction table, wherein the branch predictor is to: for each of the plurality of global history prediction tables, track a total number of unique entries that provide a correct prediction which is not available in a global history prediction table of lower history length within a monitoring period that includes execution of a plurality of instances of the branch instruction, and assign the floating global history prediction table as an extension to a global history prediction table of the plurality of global history prediction tables having a greatest total number of unique useful entries in the monitoring period.

24 Claims, 21 Drawing Sheets

(56) References Cited

U.S. PATENT DOCUMENTS

| | | | | |
|---|---|---|---|---|
| 2015/0363203 | A1* | 12/2015 | Lipasti | G06F 9/3806 |
| | | | | 712/240 |
| 2016/0306632 | A1* | 10/2016 | Bouzguarrou | G06F 9/3848 |
| 2018/0136937 | A1* | 5/2018 | Yang | G06F 9/3806 |
| 2018/0173533 | A1 | 6/2018 | Soundararajan et al. | |
| 2018/0314523 | A1* | 11/2018 | Sadasivam | G06F 9/3848 |
| 2019/0361707 | A1* | 11/2019 | Vougioukas | G06F 9/30145 |

OTHER PUBLICATIONS

Intel, "Intel® 64 and IA-32 Architectures Software Developer Manuals," Oct. 12, 2016, Updated—May 18, 2018, 19 pages.

Pruett S., et al., "Dynamically Sizing the TAGE Branch Predictor," Jun. 2016, 5 pages.

Schlais D.J., et al., "BADGR: A Practical GHR Implementation for TAGE Branch Predictors," 34th International Conference on Computer Design, IEEE, Oct. 2016, pp. 536-543.

Seznec A., "A New Case for the TAGE Branch Predictor," The 44th Annual IEEE/ACM International Symposium on Microarchitecture, Porto Allegre, Brazil, Dec. 2011, 12 pages.

Seznec A., et al., "A Case for (Partially) Tagged Geometric History Length Branch Prediction," Jan. 2006, 23 pages.

\* cited by examiner

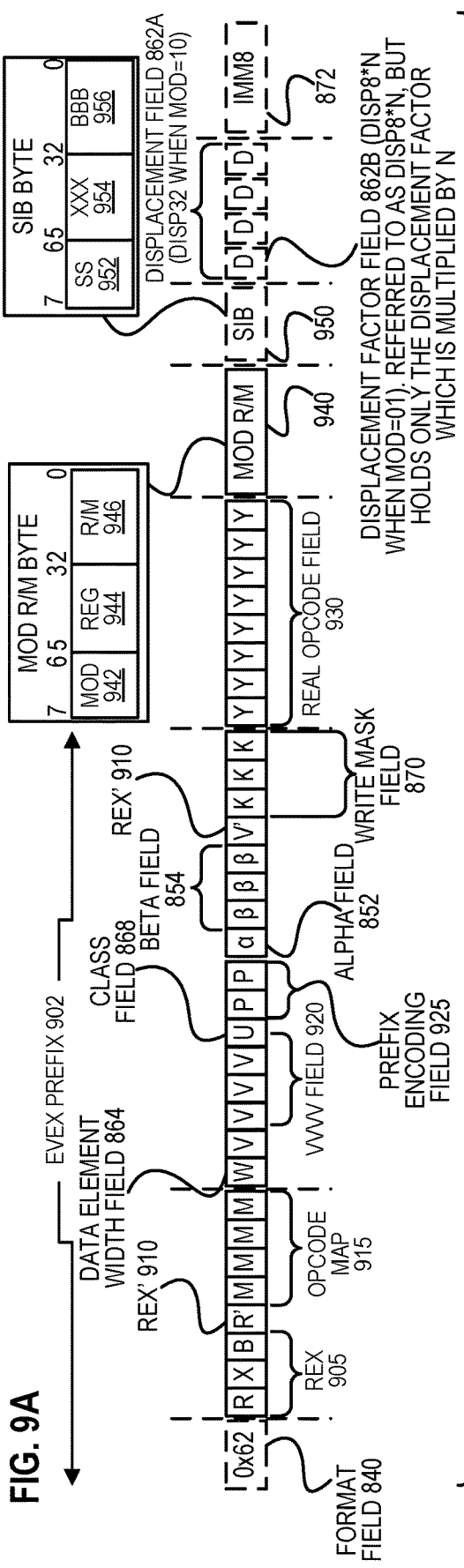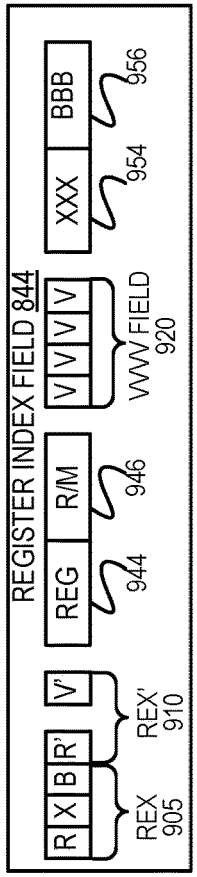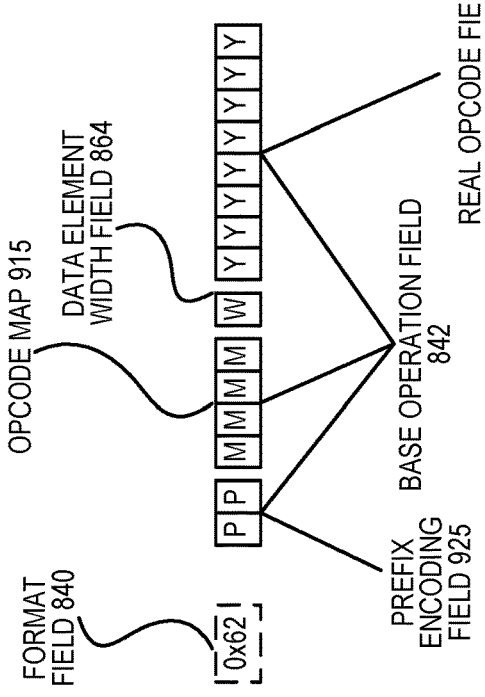

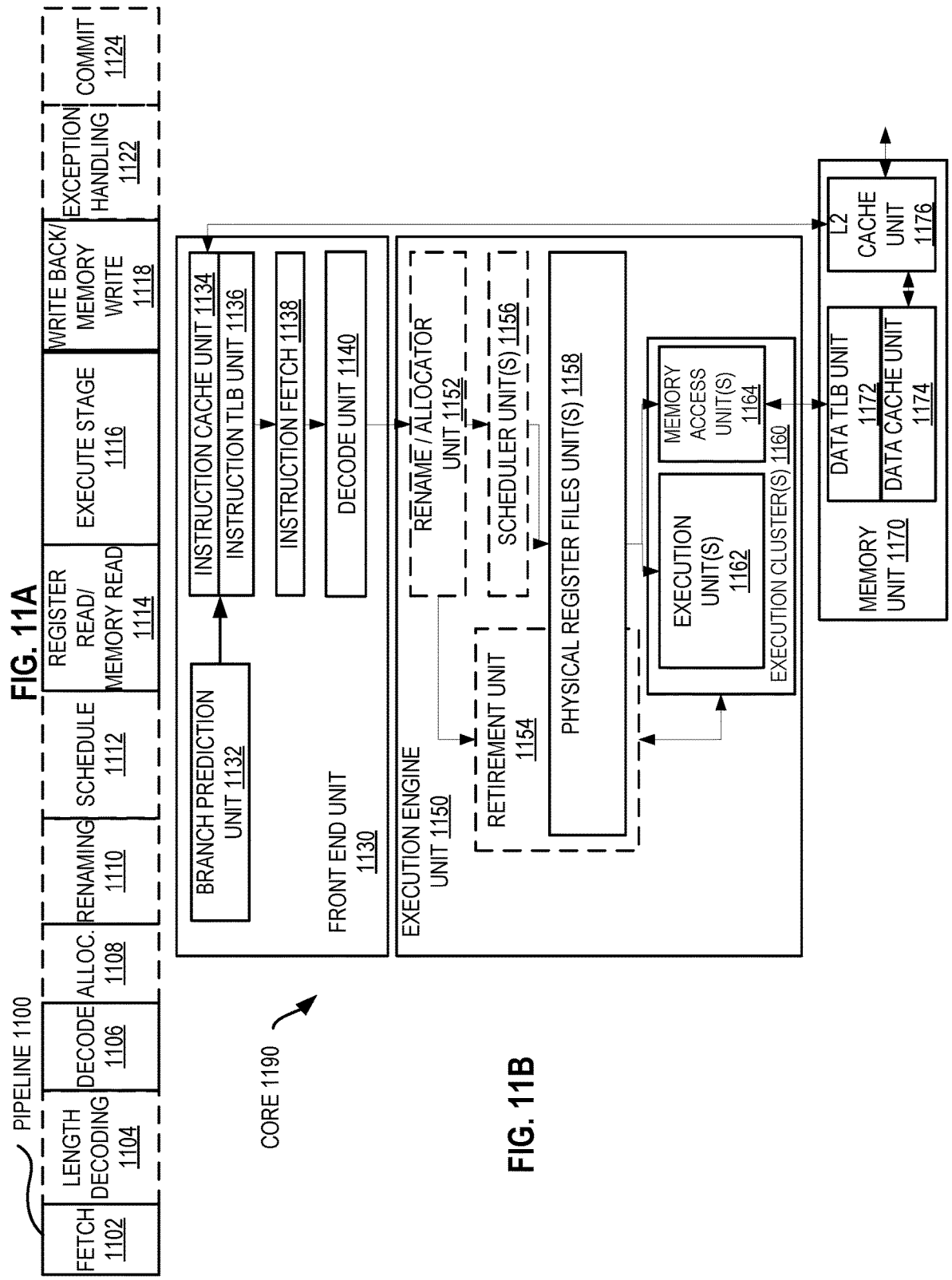

APPARATUSES AND METHODS FOR DYNAMIC ASYMMETRIC SCALING OF BRANCH PREDICTOR TABLES

TECHNICAL FIELD

The disclosure relates generally to electronics, and, more specifically, an embodiment of the disclosure relates to hardware for dynamic asymmetric scaling of branch predictor tables.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 9A is a block diagram illustrating fields for the generic vector friendly instruction formats in FIGS. 8A and 8B according to embodiments of the disclosure.

FIG. 9B is a block diagram illustrating the fields of the specific vector friendly instruction format in FIG. 9A that make up a full opcode field according to one embodiment of the disclosure.

FIG. 9C is a block diagram illustrating the fields of the specific vector friendly instruction format in FIG. 9A that make up a register index field according to one embodiment of the disclosure.

FIG. 11A is a block diagram illustrating both an exemplary in-order pipeline and an exemplary register renaming, out-of-order issue/execution pipeline according to embodiments of the disclosure.

FIG. 11B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
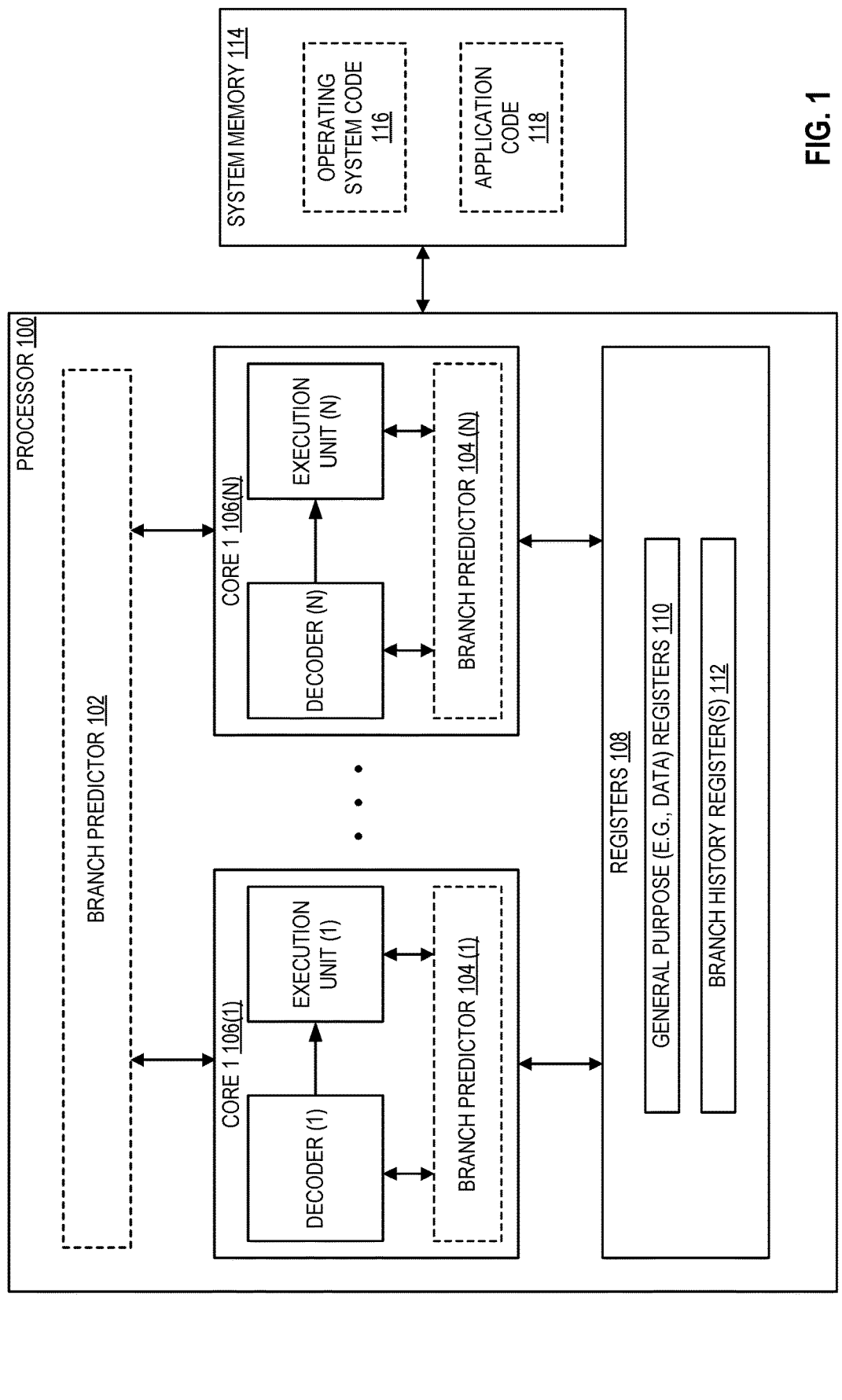
FIG. 1 illustrates a hardware processor including at least one branch predictor according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In certain embodiments, the operations (e.g., threads) performed include one or more branch operations (e.g., branch instructions).

In certain embodiments, branch operations (e.g., instructions) are either unconditional (e.g., the branch is taken every time the instruction is executed) or conditional (e.g., the direction taken for the branch is dependent upon a condition), for example, where instructions to be executed following a conditional branch (e.g., conditional jump) are not known with certainty until the condition upon which the branch depends is resolved. Here, rather than wait until the condition is resolved, a branch predictor of a processor may perform (e.g., speculative execute) a branch prediction to predict whether the branch will be taken or not taken, and/or (e.g., if predicted to be taken), predicts the target instruction (e.g., target address) for the branch. In one embodiment, if the branch is predicted to be taken, the processor fetches and speculatively executes the instruction(s) for the taken direction of the branch, e.g., the instructions found at the predicted branch target address. The instructions executed following the branch prediction are speculative in certain embodiments where the processor has not yet determined whether the prediction is correct. In certain embodiments, a processor resolves branch instructions at the back-end of the pipeline (e.g., in a retirement unit). In one embodiment, if a branch instruction is determined to be taken by the processor (e.g., by the back-end), then all instructions (e.g., and their data) presently in the pipeline behind the taken branch instruction are flushed (e.g., discarded). Certain branch instructions are referred to as indirect branch instructions, e.g., where the branch target (e.g., instruction pointer for that branch target) is stored in a (e.g., branch) register.

FIG. 1 illustrates a hardware processor 100 including at least one branch predictor 102, 104(1)-104(N) according to embodiments of the disclosure. In one embodiment, a single, centralized branch predictor 102 (e.g., circuit) is used for branch predictions for the cores 106(1)-106(N). In one embodiment, branch prediction is distributed with each core including its own local branch predictor 104(1)-104(N). Each local branch predictor 104(1)-104(N) may share data, e.g., history for branch instructions executed by processor 100.

In one embodiment, N is any integer two or greater. Hardware processor 100 is depicted as coupled to a system memory 114, e.g., forming a computing system 101. A core of (e.g., each core 106(1)-106(N) of) hardware processor 100 may include any of an instruction fetch unit, decoder, execution unit, or retirement unit.

Depicted hardware processor 100 includes registers 108. Registers 108 may include one or more general purpose (e.g., data) registers 110 to perform (e.g., logic or arithmetic) operations in, for example, additionally or alternatively to access of (e.g., load or store) data in memory 114. Registers 108 may include one or more branch history register(s) 112. In one embodiment, processor 100 (e.g., a branch predictor thereof) is to populate branch history data (e.g., context data) into the branch history register(s) 112 based on the previous execution of instructions, e.g., branch instructions. In another embodiment, the branch history may be saved into system memory 114. Branch history may include a global history of a branch instruction (e.g., including a history of the path taken by a series of branches through the currently executing program code to reach the branch instruction) with an address identifier of the branch instruction (e.g., an instruction pointer value or program counter value associated with the branch instruction). In certain embodiments, the global branch (e.g., path and/or direction) history includes direction information that indicates how often the resolved direction of the branch instruction is taken or not taken, e.g., to provide predictions for future instances of the branch instruction. In certain embodiments, global branch (e.g., path and/or direction) history includes path information that indicates the path (e.g., the instructions executed) to reach the branch instruction for a particular prediction, e.g., a proper subset of the executed instructions to reach the branch instruction for a particular prediction.

System memory 114 may include (e.g., store) one or more of (e.g., any combination of) the following software: operating system (OS) code 116 or application code 118.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. In one embodiment, processor 100 has a single core. In certain embodiments, computing system 101 and/or processor 100 includes one or more of the features and/or components discussed below, e.g., in reference to any Figure herein.

As one example, a branch predictor improves the functioning of a pipelined processor, e.g., by generating a prediction of whether a to-be executed instance of a conditional instruction (e.g., a conditional jump) will be taken (e.g., the condition is true) or not taken (e.g., the condition is false).

A processor (e.g., microprocessor) may employ the use of pipelining to enhance performance. Within certain embodiments of a pipelined processor, the functional circuitry (e.g., fetch, decode, execute, retirement, etc.) for executing different stages of an instruction operates simultaneously on multiple instructions to achieve a degree of parallelism leading to performance increases over non-pipelined processors. In one embodiment, an instruction fetch unit (e.g., instruction fetch circuit), an instruction decoder (e.g., decode unit or decode circuit), and an instruction execution unit (e.g., instruction execution circuit) operate simultaneously. During one clock cycle, the instruction execution unit executes a first instruction while the instruction decoder decodes a second instruction and the fetch unit fetches a third instruction in certain embodiments. During a next clock cycle, the execution unit executes the newly decoded instruction while the instruction decoder decodes the newly fetched instruction and the fetch unit fetches yet another instruction in certain embodiments. In this manner, neither the fetch unit nor the decoder need to wait for the instruction execution unit to execute the last instruction before processing new instructions. In certain embodiments, the results of the executed instruction(s) (e.g., instructions taken for one direction after a conditional branch) are kept (e.g., made visible) if the prediction was correct and discarded (e.g., the effects rolled-back) if the prediction was incorrect.

Figure 2:
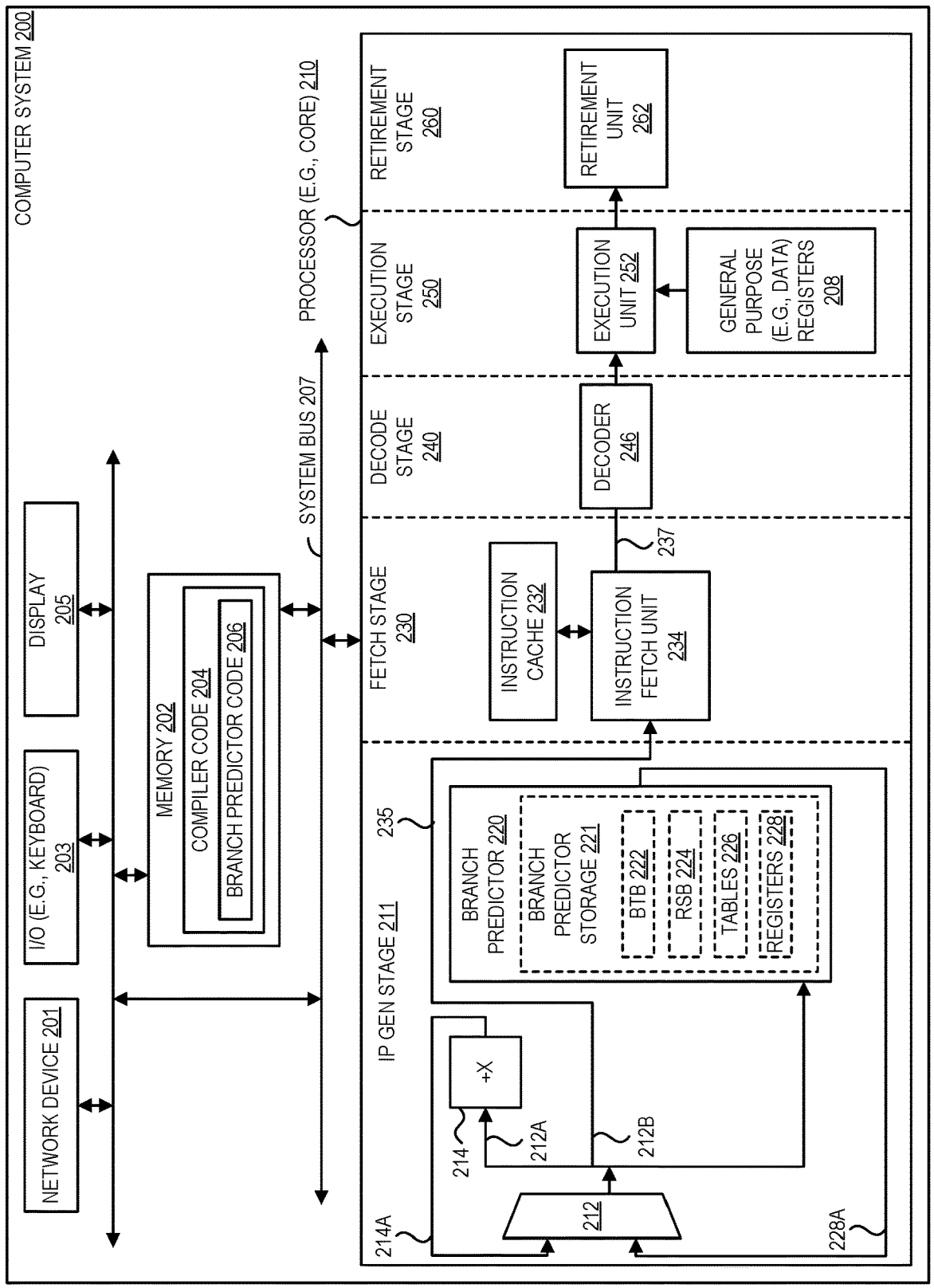
FIG. 2 illustrates a computer system including a branch predictor in a pipelined processor according to embodiments of the disclosure.

FIG. 2 illustrates a computer system 200 including a branch predictor 220 in a pipelined processor 210 (e.g., processor core) according to embodiments of the disclosure. In one embodiment, each core of processor 100 in FIG. 1 is an instance of a processor core 210, where N is any positive integer. In the depicted embodiment, each single processor (e.g., each core 210) includes an instance of branch predictor 220. Branch predictor 220 may include branch predictor storage 221. Branch predictor storage 221 may include a branch target buffer (BTB) 222, a return stack buffer 224 (RSB), history tables 226, registers 228, and/or other data storage structures. One or more of these may be only used by a single branch predictor, or they may be maintained and/or used by any branch predictor of multiple branch predictors.

In certain embodiments, branch target buffer 222 stores (e.g., in a branch predictor array) the predicted target instruction corresponding to each of a plurality of branch instructions (e.g., branch instructions of a section of code that has been executed multiple times). In certain embodiments, return stack buffer 224 (RSB) is to store (e.g., in a stack data structure of last data in is the first data out (LIFO)) the return addresses of any CALL instructions (e.g., that push their return address on the stack). In certain embodiments, history tables 226 store history for each of multiple branches of code being performed by the processor 210, e.g., as discussed below. In certain embodiments, registers 228 include a register to store branch global path history and/or a register to store branch global direction history.

In one embodiment, processor 210 is a pipelined processor core that includes an instruction pointer generation (IP Gen) stage 211, a fetch stage 230, a decode stage 240, an execution stage 250, and a retirement stage 260. Each of the pipelined stages shown in processor core 210 may include varying levels of circuitry. Alternatively, the pipeline stages may be sub-divided into a larger number of stages. Moreover, additional pipeline stages, such as a prefetch stage, may also be included.

The IP Gen stage 211, as depicted in FIG. 2, selects instruction pointers (e.g., memory addresses) which identify the next instruction in a program sequence that is to be fetched and executed by the core (e.g., logical core). In one embodiment, the IP Gen stage 211 increments the memory address of the most recently fetched instruction by a predetermined amount X (e.g., 1), each clock cycle.

However, in the case of an exception, or when a branch instruction is taken, the IP Gen stage 211 may select an instruction pointer identifying an instruction that is not the next sequential instruction in the program order. In certain embodiments, the IP Gen stage also predicts whether a conditional branch instruction is taken, for example, to decrease branch penalties.

The fetch stage 230, as depicted in FIG. 2, accepts instruction pointers from the IP Gen stage 211 and fetches the respective instruction from memory 202 or instruction cache 232. The decode stage 240 performs decode operations to decode an instruction into a decoded instruction. The execution stage 250 performs an operation as specified by a decoded instruction. The retirement stage retires the executed instruction, e.g., with the results of the executed instruction(s) (e.g., instructions taken for one direction after a conditional branch) are kept (e.g., made visible) if the branch prediction was correct and discarded (e.g., the effects rolled-back) if the branch prediction was incorrect. In alternative embodiments, the pipelined stages described above may also include additional operations.

As one example, the IP Gen Stage 211 of the core (e.g., IP Gen mux 212) selects an instruction pointer from a set of inputs, each of which are configured to provide an instruction pointer to the core (e.g., IP Gen mux 212). The inputs of the core (e.g., IP Gen mux 212) may be pre-assigned with respective priorities to assist the IP Gen Stage 211 (e.g., IP Gen mux 212) in selecting which input will pass through the IP Gen Stage 211 (e.g., mux 212) onto the fetch stage 230 (e.g., instruction fetch unit 234).

As shown in FIG. 2, the IP Gen mux 212 receives an instruction pointer from line 214A. The instruction pointer provided via line 214A is generated by the incrementer circuit 214, which receives a copy of the most recent instruction pointer from the path 212A. The incrementer circuit 214 may increment the present instruction pointer by a predetermined amount, to obtain the next sequential instruction from a program sequence presently being executed by the core.

The IP Gen mux 212 is also shown to be receiving an instruction pointer from the branch prediction line 228A. The instruction pointer provided via the branch prediction line 228A is generated by the Branch Predictor 220 (e.g., Branch Predictor Unit (BPU)), which is discussed in more detail below. In certain embodiments, the branch prediction line 228A provides the IP Gen mux 212 with the instruction corresponding to a predicted taken direction for a conditional instruction (or the instruction corresponding to a predicted not taken direction for a conditional instruction) and/or branch target (e.g., target instruction) for a branch instruction which the branch predictor has predicted. Additional input lines may be received by the IP Gen mux 212, for example, lines to account for detecting exceptions and for correcting branch predictions may also be received by the IP Gen mux 212.

In this example, an indicator of the instruction pointer (IP) (e.g., copy of the instruction pointer) selected by the IP Gen mux 212 is forwarded to the branch predictor 220 via line 212B. (Hereinafter for this section, the instruction pointer selected by the IP Gen mux will be referred to as "the IP".) In certain embodiments, the branch predictor 220 includes or accesses storage having one or more entries, with each entry capable of storing data identifying a branch instruction and corresponding data identifying the predicted direction (e.g., taken or not taken) and/or the predicted branch target of the branch instruction.

In one embodiment, the branch instructions stored in the branch predictor 220 are pre-selected by a compiler from code to be executed. In certain embodiments, the compiler code 204, as shown stored in the memory 202 of FIG. 2, includes a sequence of code that, when executed, translates source code of a program written in a high-level language into executable machine code. In one embodiment, the compiler code 204 further includes additional branch predictor code 206 that predicts a direction (e.g., taken or not taken) and/or a target instruction for branch instructions (for example, branch instructions that are likely to be taken (e.g., pre-selected branch instructions)). The branch predictor 220 (e.g., BTB 222 thereof) is thereafter updated with a direction prediction and/or a predicted target instruction for a branch instruction.

Depicted core (e.g., branch predictor 220 thereof) includes access to one or more registers (e.g., registers 208 or registers 228). In certain embodiments, processor (e.g., core) include one or more of general purpose register(s) 208 and branch prediction history registers (e.g., registers 228).

Figure 3A:
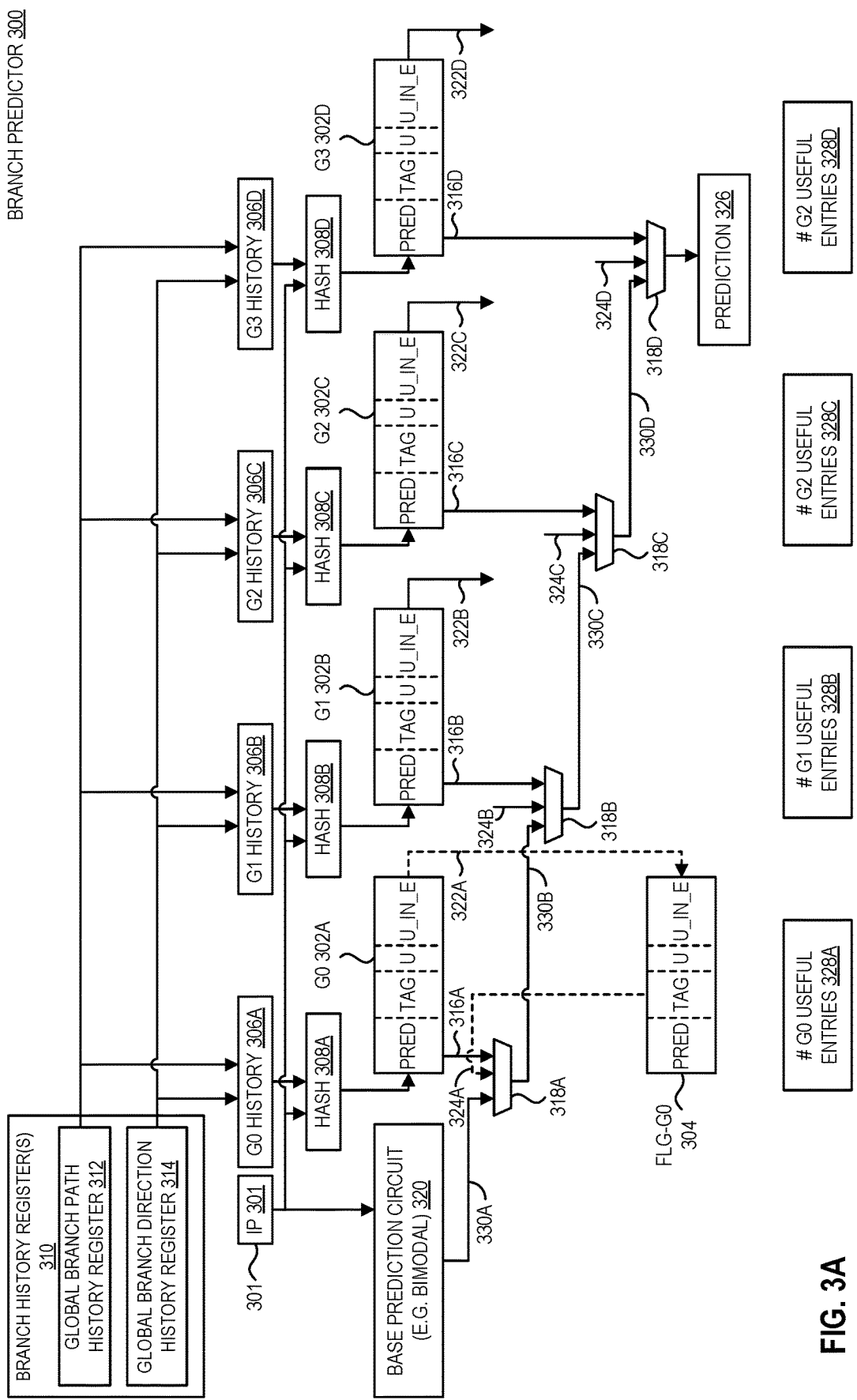
FIG. 3A illustrates a branch predictor including a floating global history prediction table according to embodiments of the disclosure.
Figure 3B:
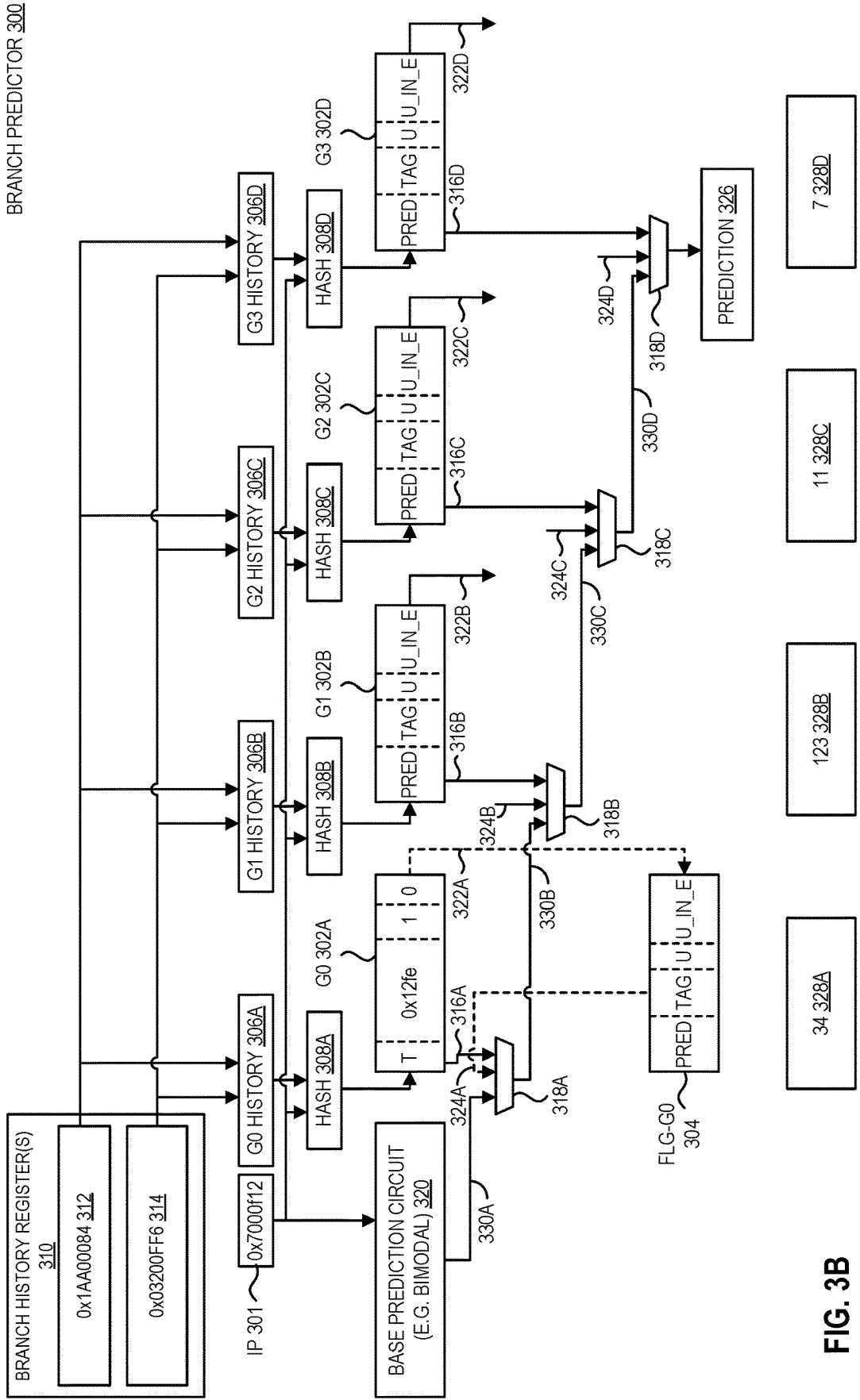
FIG. 3B illustrates example values populated in the branch predictor in FIG. 3A according to embodiments of the disclosure.

In certain embodiments, each entry for the branch predictor 220 (e.g., in storage 221 thereof) includes a tag field and a prediction field, for example, as discussed in reference to FIGS. 3A-3B. In certain embodiments, each entry includes a target field indicating a predicted target instruction of an indirect branch instruction (e.g., for its tag) input into the branch predictor.

In one embodiment, the tag field of each entry in the branch predictor storage 221 stores at least a portion of an instruction pointer (e.g., memory address) identifying a branch instruction or a hash of that instruction pointer with branch prediction history.

In this example, once the branch predictor 220 receives the IP (e.g., from the IP Gen mux), the branch predictor 220 compares the received IP (e.g., a portion of the IP) with the (e.g., corresponding portion of the) tag field of each entry (e.g., in BTB 222 thereof). The branch predictor 220 performs the comparison to determine if the received IP (e.g., or hash thereof) corresponds (e.g., matches) to an entry therein. In one embodiment, the IP gen mux selects the IP and the branch predictor 220 performs the compare operation within the same clock cycle. Alternatively, the compare operation of the branch predictor 220 may occur in a clock cycle following the selection of the IP.

If no match is found between the IP and the tag fields (e.g., in BTB 222), the next sequential IP is selected (e.g., by the IP Gen mux) as the next instruction to be fetched in certain embodiments. However, if the branch predictor 220 detects a match between the IP and a tag field (e.g., in BTB 222), an indicator (e.g., or copy of) of the predicted direction and/or the branch target corresponding to the matching tag field is sent to fetch unit 234. In one embodiment, the indicator (e.g., or copy thereof) for the predicted direction corresponding to the matching tag field is forwarded to the IP Gen mux, via the branch prediction line 228A, and the predicted direction is used to select the next instruction that corresponds to the condition being taken if the prediction is "taken" or the next instruction that corresponds to the condition being not taken if the prediction is "not taken". In another embodiment, the indicator (e.g., or copy of) for the branch target corresponding to the matching tag field is forwarded to the IP Gen mux, via the branch prediction line 228A. Assuming the branch prediction line 228A has the highest priority among the asserted lines received by the IP Gen mux, the next instruction that corresponds to the condition being taken if the prediction is "taken" or the next instruction that corresponds to the condition being not taken if the prediction is "not taken" (and/or the branch target) is passed onto the instruction fetch unit 234 via line 235 to begin fetching instruction(s) at the respective address. The fetched instruction is sent to the decoder 246 (e.g., via line 237) to be decoded, and the decoded instruction is sent to the execution unit 254 to be executed. The executed instruction is sent to the retirement unit 262 to be retired. In one embodiment, the retirement unit 262 causes an update of branch history (e.g., a correct prediction for a predicted branch) for a retired instruction. Depicted computer system 200 further includes a network device 201, input/output (110) circuit 203 (e.g., keyboard), display 205, and a system bus (e.g., interconnect) 207.

Branch prediction is indispensable for good performance in certain embodiments of wide, super-scalar processors. For example, accurate branch prediction is increasingly important for good performance as the out of order (OOO) width of processors increases.

Examples of (e.g., conditional) branch predictors includes a bimodal branch predictor (e.g., using a proper subset of the instruction pointer (IP) of the branch instruction as an index into a history table of predictions (e.g., predicting taken (T) or predicting not taken (NT)) and a TAgged GEometric history length (TAGE) branch predictor (e.g., to predict a direction), although other types of branch predictors may be used with the embodiments discussed herein. Another example of a branch predictor (e.g., to predict a target) is an Indirect Target TAgged GEometric history length (ITTAGE) branch predictor.

Certain branch predictors (e.g., a TAGE predictor) makes predictions based on the global history of branches, e.g., the direction (taken or not taken) for a selected number (N) of the most recent branches that were executed, and a plurality of prediction tables (e.g., updated at instruction retirement time). In one embodiment, N is 10s, 100s, 1000s, etc. of bits. In certain embodiments, a TAGE predictor achieves high prediction rates by populating multiple global history prediction tables with patterns over various (geometrically related) history lengths, and selecting a prediction from the global history prediction tables based on the longest history length that finds a match for a branch instruction, for example, a match based on the instruction pointer (e.g., program counter) of the branch instruction and the current branch history (e.g., from a branch history register). In one embodiment, the global history prediction tables are searched for a match of (i) a tag of each of its entries with (ii) a tag for the branch instruction (being searched for) generated by hashing the instruction pointer and a certain history length of the branch history (e.g., an extracted, proper subset of bits from the branch history of length N). In certain embodiments, the branch history (e.g., of executed conditional branches) is stored in one or more branch history registers.

In certain embodiments, predictions (e.g., taken or not taken) are stored in each entry of a global history prediction table. In one embodiment, a global history prediction table is updated based on a conditional branch instruction being either taken or not taken, and recording the result (e.g., resolved direction) (e.g., at retirement time) as a prediction in an entry in a corresponding global history prediction table, e.g., tables of differing history lengths.

In one embodiment, each history length is a respective number (e.g., any number) of executed branches (e.g., 1, 10, 100, 1000, 10,000, 100,000, 1,000,000, etc. of executed branches). In one embodiment of TAGE, the set of available history lengths (e.g., and thus the number of corresponding global history prediction tables) is a geometric series, for example, the set of 0, 2, 4, 8, 16, 32, 64, 128, 256, 512, 1024, 2048, 4096, etc. bit lengths.

Global branch history may generally refer to the history (e.g., taken or not taken for a conditional branch) of all the recently executed branch instructions in a program. In certain embodiments, a branch predictor (e.g., TAGE predictor) uses a series of tables indexed with the branch instruction pointer (IP) being predicted. In one embodiment, the branch IP is hashed with a certain number of (e.g., less than all) bits (e.g., determined by the global history length associated with a particular table) from a global branch history (for example, a value that indicates a history for a (e.g., any) threshold number of branches recently executed by the processor) and that hashed value is used as the index for an entry that is stored in a global history prediction table (e.g., a TAGE table). In one embodiment, global history prediction (e.g., TAGE) tables are assigned different history lengths in order to capture both recent and distant (e.g., global history) correlations among branch instructions. In one embodiment, a branch predictor (e.g., TAGE branch predictor) populates global history prediction (e.g., TAGE) tables by identifying the history length that best captures correlations for a given branch instruction pointer (IP) and attempts to makes allocations for the IP only in the corresponding global history prediction (e.g., TAGE) table, e.g., to make effective use of the table space while capturing the behavior of as many branch IPs as possible.

Certain branch predictors (e.g., branch predictor circuits) have global history prediction tables (e.g., TAGE tables) that each have a same size (e.g., storage space for the same number of entries) for different history lengths. This may be referred to as symmetric global history prediction tables. In certain embodiments, symmetric global history prediction tables make the hardware design consume less power and/or use less area in a circuit than asymmetric global history prediction tables, which in turn results in better performance. However, apportioning the same space for all history lengths is suboptimal for many workloads and results in reduced performance in those embodiments. Using asymmetric global history prediction tables of pre-determined static sizes (e.g., statically determined sizes) is also suboptimal for many workloads since the static sizes might not be optimal for all the workloads in certain embodiments. Moreover, static global history prediction tables cannot adapt to run-time phase behaviors exhibited by various workloads in certain embodiments.

Certain embodiments herein improve branch predictor performance (e.g., relative to a static symmetric global history prediction table, or a static asymmetric table design) by dynamically proportioning extra space to certain of the global branch history tables. In one embodiment, the extra space is a floating global history prediction table that is coupled (e.g., assigned) as an extension to a (e.g., single) (e.g., fixed) global history prediction table (e.g., the best performing global history prediction table at run-time). In certain embodiments, the floating global history prediction table is selectively coupled (e.g., assigned) as an extension to a (e.g., single) (e.g., fixed) global history prediction table based on a performance value (e.g., the best performing global history prediction table at run-time), for example, without only using statically pre-determined sizes of (e.g., symmetric or asymmetric) tables (e.g., sizes based on simulations across workloads of interest). Certain embodiments of branch predictors herein use a set of fixed size global history prediction tables (e.g., each having a same size) and assign a (e.g., fixed size) floating global history prediction table (e.g., having the same size as each of the global history prediction tables) to improve performance of the branch predictor, for example, in contrast to allocating storage to each table from a set of tiles. Certain embodiments herein have a fixed (e.g., at run time) number of entries for each global history prediction table, for example, each global history prediction table implemented as a single tile with the fixed number of entries. Certain embodiments herein provide for floating global history prediction tables and/or (non-floating) global history prediction tables where each table (e.g., each tile implementing a single table) allows different tag sizes to be selectable for each table, for example, to save storage in short history tables while reducing aliasing in long history tables. Certain embodiments herein provide for the total number of floating global history prediction tables and/or (e.g., non-floating) global history prediction tables (e.g., with each table implemented as its own respective tile) used in a branch predictor to be any number, e.g., not limited to being a power of 2 in the branch predictor. Certain embodiments herein of a branch predictor assign a floating global history prediction table to a (e.g., non-floating) global history prediction table based on the highest total number of unique useful entries in a monitoring period, e.g., in contrast to dynamically allocating storage to a plurality of the most highly congested tables.

Thus, certain embodiments herein provide a simple, dynamic branch predictor that provisions more space to the history length that best captures correlations for the workload being executed, helps capture branch correlations better, and consequently improves performance. Certain embodiments herein reduce the average Misses-Per-Kilo (thousand)-Instruction (MPKI) and reduce the number of mispredictions compared to merely increasing the size of each table. The discussion of FIGS. 3A-3B below describes embodiments of branch predictors (e.g., branch predictor circuits).

FIG. 3A illustrates a branch predictor 300 including a floating global history prediction table 304 according to embodiments of the disclosure. Depicted branch predictor 300 includes a plurality of global history prediction tables (302A-302D). Although depicted as four global history prediction tables, any plurality of global history prediction tables may be used. In one embodiment, global history prediction table G0 (302A) has a history length (length one (L1)) (e.g., of a history length provided from branch history register(s) 310) that is less than the history length (L2) of global history prediction table G1 (302B), the history length (L2) of global history prediction table G1 (302B) is less than the history length (L3) of global history prediction table G2 (302C), and the history length (L3) of global history prediction table G2 (302C) is less than the history length (L4) of global history prediction table G3 (302D). In certain embodiments, a processor (e.g., any processor discussed herein) requests a branch prediction as output from branch predictor 300.

Depicted branch predictor 300 includes a floating global history prediction table 304 that is selectable coupled (e.g., assigned) to any of (e.g., any one of at a single time) global history prediction tables (302A-302D). In one embodiment, multiple of global history prediction tables (302A-302D) (e.g., a proper subset of global history prediction tables (302A-302D)) includes a coupling to its own floating global history prediction table instance.

In certain embodiments, each of the global history prediction tables (302A-302D) and/or the floating global history prediction table 304 includes one or more (e.g., a plurality of) entries that each have the following (e.g., TAGE) format: prediction bit(s) (pred) (e.g., counter), (e.g., partial) tag bit(s), and useful (u) bit(s) (e.g., counter). In certain embodiments, the most significant bit (e.g., leading bit) of a prediction counter of an entry in global history prediction table being set to a first value (e.g., binary one) indicates a prediction of taken for that entry (e.g., tag for that entry) and a second value (e.g., binary zero) indicates a prediction of taken for that entry (e.g., tag for that entry). In one embodiment, a prediction counter for an entry in a global history prediction table is (e.g., after reset) to increment when the prediction (e.g., prediction 326) of that entry was correct (e.g., at retirement of that instruction) and/or decrement when the prediction of that entry was incorrect. In certain embodiments, the tag is a value corresponding to the history length of a particular global history prediction table (e.g., L1, L2, L3, or L4 as the lengths discussed in reference to FIGS. 3A-3B). In one embodiment, the tag is a hash (e.g., mapping data of arbitrary size to data of a fixed size) of the (e.g., next) instruction pointer (IP) 301 that is input into branch predictor 300 and the respective branch history, e.g., length of L1, L2, L3, or L4 of branch history shown as 306A, 306B, 306C, and 306D, for global history prediction tables 302A-302D, respectively. In one embodiment, a new tag is stored in an entry when there is available space, for example, when a less useful (u) entry is evicted. In certain embodiments, the "provider component" is the matching component (e.g., global history prediction table) with the longest history length and the "alternate prediction" (altpred) is the prediction that would have occurred if there had been a miss on the provider component. If there is no hit on a tagged component, then the alternate prediction is the default prediction in this embodiment. In certain embodiments, a useful (u) counter of a provider component is updated when the alternate prediction is different from the actual prediction (pred) for the component. In one embodiment, the useful (u) counter of the provider component is (e.g., only) incremented when the actual prediction (pred) is correct (e.g., and the alternate prediction (altpred) is incorrect), and decremented otherwise. In one embodiment, the actual prediction (e.g., taken or not taken) of a conditional branch instruction is compared against the results of the executed conditional branch instruction when the executed conditional branch instruction is retired (e.g., or is being retired). In certain embodiments, the value of the useful counter is used to pick victims and manage entries in a table. In one embodiment, a format of a table entry includes one or more of prediction bit(s) (pred) (e.g., counter), (e.g., partial) tag bit(s), or useful (u) bit(s) (e.g., counter) fields.

In certain embodiments, each entry of the global history prediction tables (302A-302D) and/or the floating global history prediction table 304 includes a (e.g., "useful_in_epoch") tracking bit. In another embodiment, other storage (e.g., registers 108) stores each (e.g., "useful_in_epoch") tracking bit. In one embodiment, the (e.g., useful_in_epoch) tracking bit is set (e.g., to binary one) by the branch predictor for an entry in a monitoring period (e.g., epoch) for each (unique) entry that provides a correct prediction which is not available in a global history prediction table of lower history length. In one embodiment, an epoch is the time taken for execution of a certain number (e.g., 10, 100, 1000, 10,000, 100,000, 1,000,000, etc.) of conditional branch instructions (e.g., in a program). In one embodiment, the (e.g., all tracking bits in all global history prediction tables 302A-302D and floating global history prediction table 304) is cleared (e.g., to binary zero) for each entry by the branch predictor at the end of each monitoring period (e.g., epoch). In one embodiment, the (e.g., useful_in_epoch) tracking bit is cleared (e.g., to binary zero) in each entry of a global history prediction table (e.g., including the floating global history prediction table) by the branch predictor at the end of each monitoring period (e.g., epoch), but the useful counter in each entry is not cleared based on the end of a monitoring period is reached (although it may be cleared for other reasons, e.g., table eviction). In one embodiment, the history length represented in the tags for the floating global history prediction table is changed to match the history length represented in the tags for the fixed global history prediction table that is being extended.

In certain embodiments, a total number of unique (e.g., in a monitoring period) useful entries for a single global history prediction table is determined by determining the number of (e.g., useful_in_epoch) tracking bits set for any of the entries in the single global history prediction table. In one embodiment, the total number of unique (e.g., in a monitoring period) useful entries (e.g., the total number of set tracking bits) is stored in respective storage (e.g., register(s)) of branch predictor 300. In the depicted embodiment, storage 328A, 328B, 328C, and 328D stores the total number of unique (e.g., in a monitoring period) useful entries for each global history prediction table 302A, 302B, 302C, and 302D, respectively. In one embodiment, the total number of unique (e.g., in a monitoring period) useful entries for each global history prediction table 302A, 302B, 302C, and 302D includes the total number of unique (e.g., in the monitoring period) useful entries for a single, floating global history prediction table 304 that extends a global history prediction table 302A-302D.

In an embodiment where the single, floating global history prediction table is coupled to (e.g., assigned to) a single fixed global history prediction table 302A-302D, the total number of unique (e.g., in a monitoring period) useful entries for the single, floating global history prediction table is added to the total for the single fixed global history prediction table (e.g., shown as fixed global history prediction table 302A in FIG. 3A) in storage (e.g., number of unique useful entries storage 328A in FIG. 3A). In one embodiment where the single, floating global history prediction table 304 is (e.g., cleared of all entries in this process and then) reassigned to a different, single fixed global history prediction table 302B-302D after the monitoring period, the total number of unique (e.g., in the next monitoring period) useful entries for the single, floating global history prediction table 304 is added to the total number of unique (e.g., in the next monitoring period) useful entries for that now extended single global history prediction table 302B, 302C, or 302D. In one embodiment, the total number of unique useful entries for each (extended or not extended by a floating table) global history prediction table in a monitoring period is tracked (e.g., in a running total) for a plurality of monitoring periods (e.g., a plurality of epochs), e.g., and the total number is used to decide which particular (fixed) global history prediction table 302B, 302C, or 302D will be augmented with the floating global history prediction table 304 in the next monitoring period.

When it is determined (e.g., as discussed below) to extend a particular (fixed) global history prediction table 302B, 302C, or 302D, the output 322A-322D (respectively) of the particular (fixed) global history prediction table 302B, 302C, or 302D is coupled to an input (e.g., to receive an update for one or more of the entries of that table) of a floating global history prediction table (e.g., single, floating global history prediction table 304), and an output (e.g., to send the prediction from the floating table) of the floating global history prediction table is coupled to an input 324A-324D (respectively) of a circuit that sources prediction 326. In the depicted embodiment, each instance of (fixed) global history prediction table 302B, 302C, or 302D includes a respective multiplexer 318A-318D to source a (e.g., bimodal) prediction from base prediction circuit 320 on a first input 330A-330D, a (e.g., TAGE) prediction from a floating global history prediction table 304 (if coupled/assigned) from a second input 324A-324D, and a (e.g., TAGE) prediction from a third input 316A-316D coupled to fixed global history prediction table 302A-302D, respectively. In the depicted embodiment, the floating global history prediction table 304 is shown as extending global history prediction table 302A, and thus the output of floating global history prediction table 304 is coupled to the second input 324A of multiplexer 318A and the input of floating global history prediction table 304 is coupled to the extension output of global history prediction table 302A. The control lines and other switches to couple floating global history prediction table 304 to any of the fixed global history prediction tables 302A-302D are not shown so as to not obfuscate the data flow/lines. In one embodiment, the multiplexer control values are sent from branch predictor 300 (e.g., a state machine thereof) to implement a (e.g., TAGE) branch prediction.

In one embodiment, a branch predictor 300 includes branch history register(s) 310 to store at least one value that that indicates how often the resolved direction of the executed branch instructions is taken or not taken (e.g., for the last 1, 10, 100, 1000, 10,000, 100,000, 1,000,000, etc. of executed branches). In one embodiment, branch history registers 310 are each shift registers which are updated on every branch execution. In certain embodiments, branch history register 310 includes a global branch path history register 312 and/or a global branch direction history register 314. In one embodiment, global branch direction history register 314 stores a direction value updated by the branch predictor 300 (or a processor including branch predictor 300), and the direction value indicates how often the resolved direction of the branch instruction is taken or not taken, e.g., to provide predictions for future instances of the branch instruction. In one embodiment, global branch path history register 312 stores a path value updated by the branch predictor 300 (or a processor including branch predictor 300), and the path value indicates the path (e.g., the instructions executed) to reach the branch instruction (e.g., the branch instruction being identified by its instruction pointer) for a particular prediction, e.g., a proper subset of the executed instructions to reach the branch instruction for a particular prediction. In one embodiment, the direction value from the global branch direction history register 314 and the path value from the global branch path history register 312 are combined together by performing a logical operation (e.g., exclusive OR'd (XOR'd)) on the direction value and the path value to generate a single resultant value (e.g., a branch history value).

In one (e.g., TAGE) embodiment, a portion of the branch history is used with the instruction pointer 301 to form a tag to search the tags of the global history prediction tables. As one example, the portion of the branch history may be a value from a single branch history register 310. As another example, the portion of the branch history may be a single value formed from (e.g., concatenated or performing a logical operation on) a first value from global branch path history register 312 and a second value from global branch direction history register 314. In one embodiment, the differing, increasing lengths L1, L2, L3, or L4 of branch history (shown as 306A-306D) are hashed with the instruction pointer 301 to search for a corresponding entry in global history prediction tables 302A-302D, respectively. In one embodiment, each tag is generated by the hash circuits 308A-308D for global history prediction table 302A-302D, respectively. In one embodiment, the branch predictor 300 is to select a prediction for an instruction pointer with multiple tag matches in global history prediction tables by choosing the entry from the global history prediction table with the longest history length. As one example, if a tag for an prediction request for an input instruction pointer 301 matches a tag in an entry in table G0 (302A) and matches an entry in table G3 (302D) (e.g., or a floating table assigned to either table), the prediction from the entry in table G3 (302D) (e.g., or a floating table assigned to that table) is output as the prediction 326 for that input instruction pointer 301 (e.g., and current branch history stored in register 310) because table G3 (302D) has a longer history length. In one embodiment, the multiplexers 318A-318D are thus to select a prediction for multiple matches across global history prediction tables from the entry of the global history prediction table having the longest history length. In another embodiment, a target field (e.g., identifying a predicted target instruction) is added to each entry of the global history prediction tables for indirect target prediction, e.g., and the output prediction 326 includes the data identifying the predicted target instruction.

In one embodiment, if there is no match (e.g., hit) in any of the global history prediction tables (302A-302D) or floating global history prediction table 304, the prediction 326 output is the alternate (e.g., bimodal) prediction from base prediction circuit 320.

FIG. 3B illustrates example values populated in the branch predictor 300 in FIG. 3A according to embodiments of the disclosure. In the depicted embodiment in FIG. 3B, the incoming IP 301 has a value of 0x7000f12 that hashes with the bits of G0 history 306A to form a G0 tag of 0x12fe. In this depicted scenario, the tags for the other tables (G1, G2, and G3) do not have corresponding entries in the tables. Moreover, there is no corresponding entry for the G0 tag (0x12fe) in the floating table 304 either (which is assigned to G0 in this example). In this example, the (e.g., TAGE) prediction is the G0 entry's prediction of T (taken). If, on the execution of the branch for IP 301 being 0x7000f12, the prediction is proved correct, branch predictor 300 will cause the useful counter of table G0's entry to be incremented, and the "useful in epoch" bit for the entry would also be set (since it was not set at the time of prediction), and the "greatest number of unique useful entries" counter 328A for G0 would also be incremented (from 34 to 35 in this example).

Figure 4:
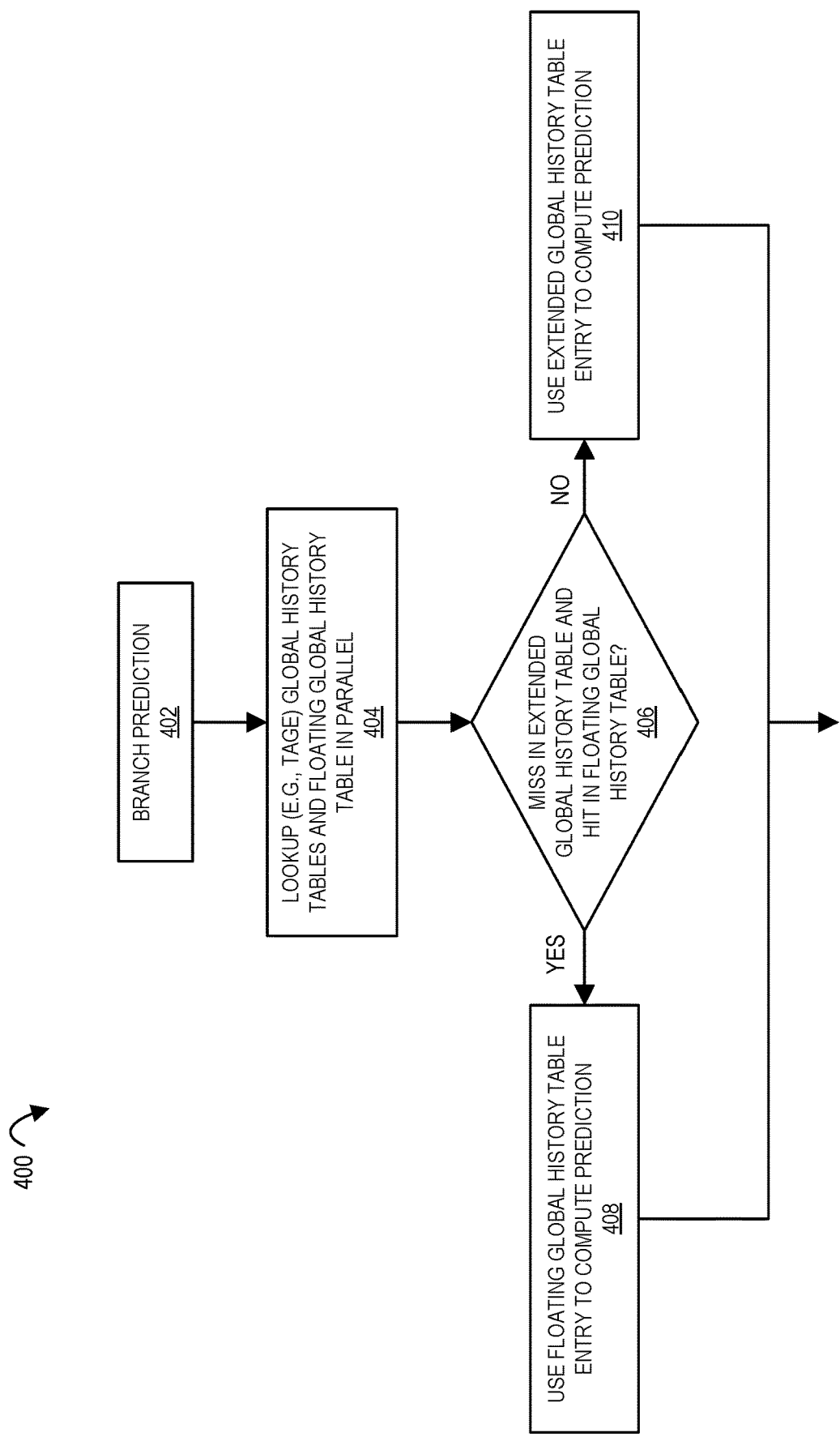
FIG. 4 illustrates a flow diagram of branch prediction with a branch predictor that includes a floating global history prediction table according to embodiments of the disclosure.

FIG. 4 illustrates a flow diagram 400 of branch prediction with a branch predictor that includes a floating global history prediction table according to embodiments of the disclosure. A branch prediction begins at 402. At 404, a lookup is performed for an instruction in the global history prediction tables and any floating global history prediction table (e.g., global history prediction tables 302A-302D and a floating global history prediction table 304 in FIG. 3) in parallel. At 406, a check is performed to determine if there is a miss in the extended global history prediction table (e.g., global history prediction table 302A is extended by floating global history prediction table 304 in FIG. 3) and a hit in the floating global history prediction table (e.g., floating table 304 in FIG. 3). If the determination is yes, the branch predictor uses the floating global history prediction table entry to compute the prediction (e.g., taken or not taken) for the instruction at 408. If the determination is no, the branch predictor uses the extended global history prediction table entry to compute the prediction (e.g., taken or not taken) for the instruction at 410.

Figure 5:
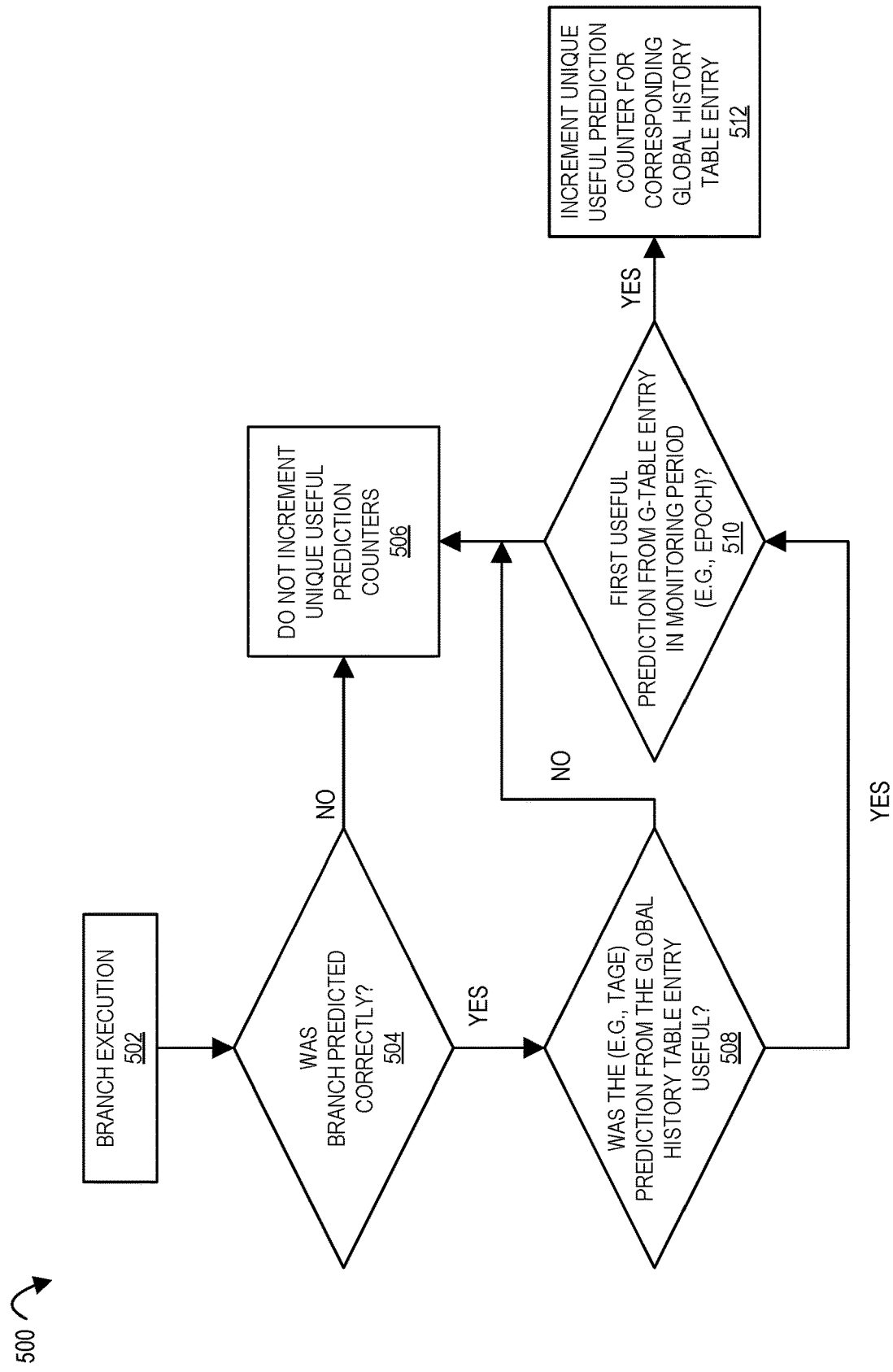
FIG. 5 illustrates a flow diagram of determining a total number of unique useful entries for each of a plurality of global history prediction tables during branch execution according to embodiments of the disclosure.

FIG. 5 illustrates a flow diagram 500 of determining a total number of unique useful entries for each of a plurality of global history prediction tables during branch execution according to embodiments of the disclosure. Branch execution begins at 502. At 504, an executed (e.g., conditional) branch instruction is checked to see if the previous prediction (e.g., taken or not) for that branch instruction was predicted correctly. If the determination is no at 504, at 506 the unique useful prediction counters (e.g., in storage 328A-328D, respectively) are not incremented. If the determination is yes at 504, at 508 it is then determined if the (e.g., TAGE) prediction from the global history prediction table entry was useful (e.g., when the actual prediction (pred) is correct and the alternate prediction (altpred) is incorrect). If the determination is no at 508, at 506 the unique useful prediction counters (e.g., in storage 328A-328D, respectively) are not incremented. If the determination is yes at 508, it is determined at 510 if the correct prediction is the first useful prediction from that global history prediction table entry in the monitoring period (e.g., epoch). If the determination is no at 510, at 506 the unique useful prediction counters (e.g., in storage 328A-328D, respectively) are not incremented. If the determination is yes at 510, at 506 the unique useful prediction counter in storage 328A-328D is incremented (e.g., increased by one) for the corresponding global history prediction table at 512.

Figure 6:
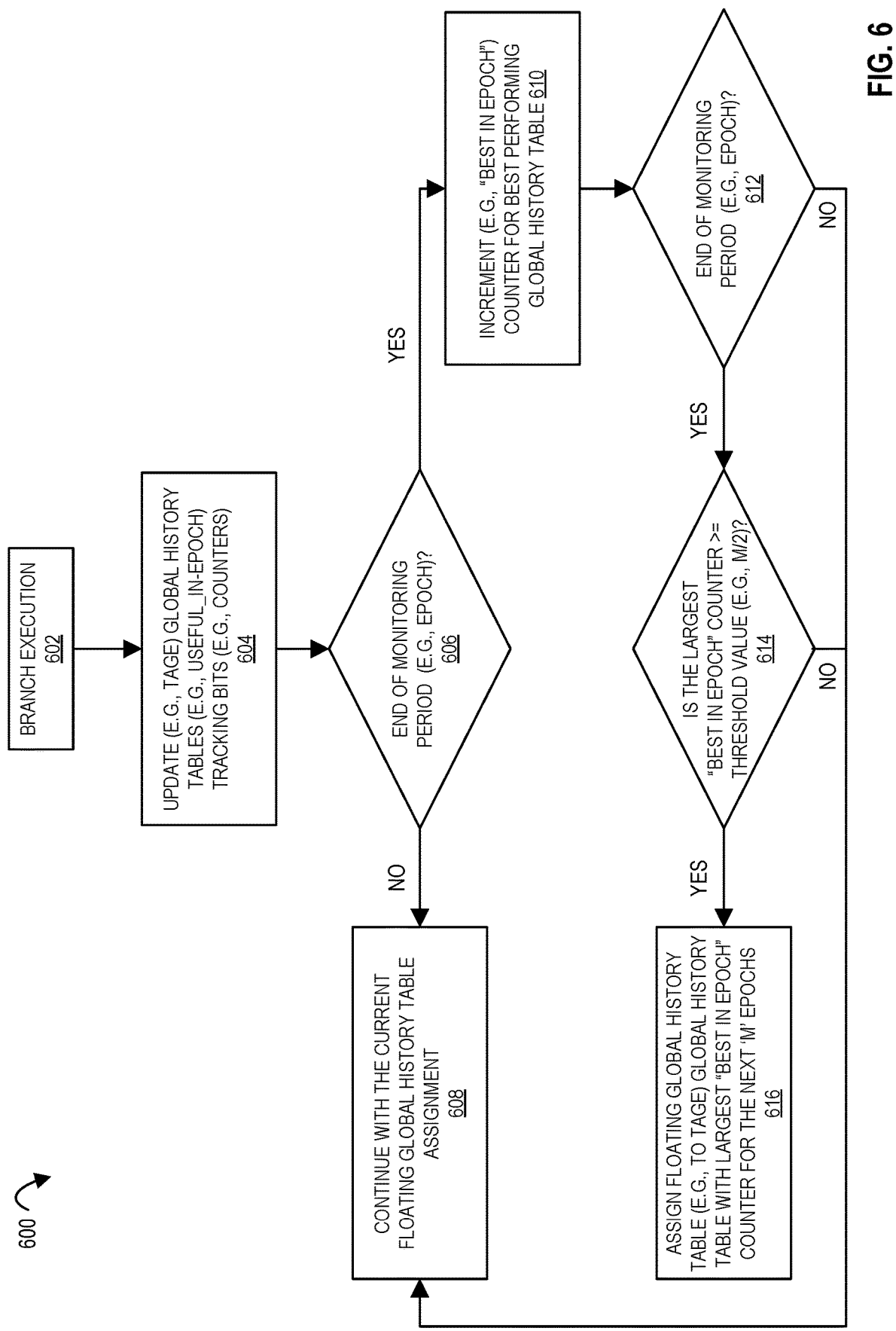
FIG. 6 illustrates a flow diagram of assigning a floating global history prediction table to a global history prediction table of a plurality of global history prediction tables according to embodiments of the disclosure.

FIG. 6 illustrates a flow diagram 600 of assigning a floating global history prediction table to a global history prediction table of a plurality of global history prediction tables according to embodiments of the disclosure. Branch execution begins at 602. At 604, the (e.g., useful_in_epoch) tracking bits (e.g., in tables 302A-302D, and floating table 304, respectively) are updated. At 606, a determination is made if it is the end of a monitoring period (e.g., epoch). If the determination is no at 606, at 608 the branch predictor continues with the current floating global history prediction table (e.g., floating global history prediction table 304 in FIG. 3A) coupling (e.g., assignment) to the fixed global history prediction table (e.g., one of tables 302A-302D in FIG. 3A). If the determination is yes at 606, at 610 the branch predictor increments the "greatest number of unique useful entries" counter (e.g., one of counters 328A-328D, respectively) for the one global history prediction table (e.g., with the extended table including the floating table in its total) with the most (e.g., useful_in_epoch) tracking bits set in that monitoring period. At 612, a determination is made if it is the end of a certain number (e.g., number "m", where m is any positive integer) of monitoring periods (e.g., epochs). If the determination is no at 612, at 608 the branch predictor continues with the current floating global history prediction table (e.g., floating global history prediction table 304 in FIG. 3A) coupling (e.g., assignment) to the fixed global history prediction table (e.g., one of tables 302A-302D in FIG. 3A). If the determination is yes at 612, at 614 the branch predictor determines if the largest of the "greatest number of unique useful entries" counters (e.g., counters 328A-328D) for the global history prediction tables is greater than a threshold value (e.g., that largest value being greater than "m"/2). If the determination is no at 614, at 608 the branch predictor continues with the current floating global history prediction table (e.g., floating global history prediction table 304 in FIG. 3A) coupling (e.g., assignment) to the fixed global history prediction table (e.g., one of tables 302A-302D in FIG. 3A). If the determination is yes at 614, at 616 the branch predictor assigns the floating global history prediction table (e.g., floating global history prediction table 304 in FIG. 3A) to the fixed global history prediction table (e.g., one of tables 302A-302D in FIG. 3A) with the largest of the "greatest number of unique useful entries" counters (e.g., counters 328A-328D) for the global history prediction tables for the next (e.g., number "m") monitoring periods. One or more counters may be stored in storage in a processor and/or branch predictor, for example, stored in registers 108 or system memory 114 in FIG. 1.

Figure 7:
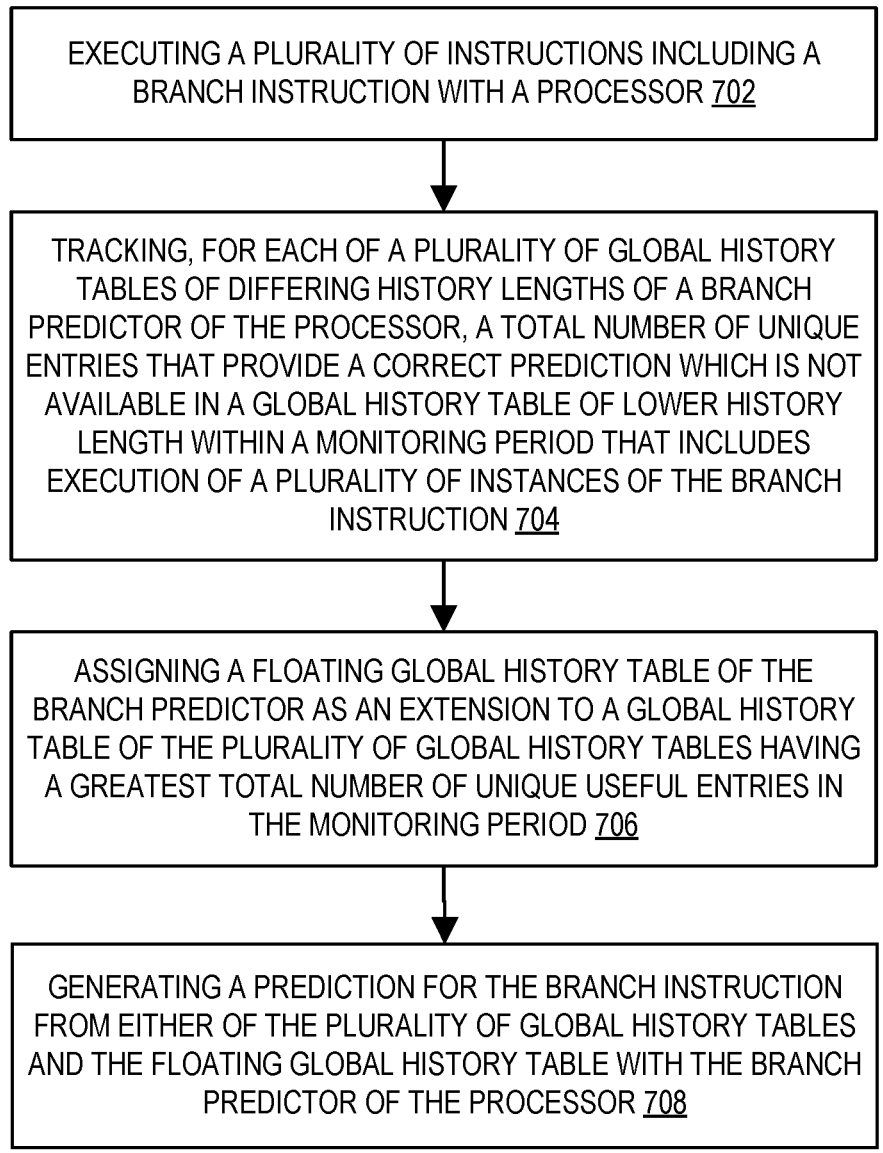
FIG. 7 illustrates a flow diagram according to embodiments of the disclosure.

FIG. 7 illustrates a flow diagram 700 according to embodiments of the disclosure. Depicted flow 700 includes executing a plurality of instructions including a branch instruction with a processor at 702; tracking, for each of a plurality of global history prediction tables of differing history lengths of a branch predictor of the processor, a total number of unique entries that provide a correct prediction which is not available in a global history prediction table of lower history length within a monitoring period that includes execution of a plurality of instances of the branch instruction at 704; assigning a floating global history prediction table of the branch predictor as an extension to a global history prediction table of the plurality of global history prediction tables having a greatest total number of unique useful entries in the monitoring period at 706; and generating a prediction for the branch instruction from either of the plurality of global history prediction tables and the floating global history prediction table with the branch predictor of the processor at 708.

In one embodiment, a processor includes an execution unit to execute a branch instruction; and a branch predictor to generate a prediction for the branch instruction from either of a plurality of global history prediction tables of differing history lengths and a floating global history prediction table, wherein the branch predictor is to: for each of the plurality of global history prediction tables, track a total number of unique entries that provide a correct prediction which is not available in a global history prediction table of lower history length within a monitoring period that includes execution of a plurality of instances of the branch instruction, and assign the floating global history prediction table as an extension to a global history prediction table of the plurality of global history prediction tables having a greatest total number of unique useful entries in the monitoring period. Each of the plurality of global history prediction tables may have a same number of entries. Each entry of a plurality of entries in the floating global history prediction table may be a same format as each entry of a plurality of entries of the global history prediction table. Each entry of the plurality of global history prediction tables and each entry of the floating global history prediction table may include a field to store a bit set by the branch predictor when a respective entry provides a correct prediction which is not available in a global history prediction table of lower history length within the monitoring period. The branch predictor may increment a respective counter for each of the plurality of global history prediction tables when the bit is set to track the total number of unique entries that provide the correct prediction which is not available in the global history prediction table of lower history length within the monitoring period. Each entry of a plurality of entries in the floating global history prediction table and each entry of a plurality of entries of the global history prediction table may include a prediction field, a tag, and a useful field. The branch predictor may store entries evicted from the global history prediction table into the floating global history prediction table that is the extension to the global history prediction table. The branch predictor may read the floating global history prediction table and the plurality of global history prediction tables in parallel at prediction time.

In another embodiment, a method includes executing a plurality of instructions including a branch instruction with a processor; tracking, for each of a plurality of global history prediction tables of differing history lengths of a branch predictor of the processor, a total number of unique entries that provide a correct prediction which is not available in a global history prediction table of lower history length within a monitoring period that includes execution of a plurality of instances of the branch instruction; assigning a floating global history prediction table of the branch predictor as an extension to a global history prediction table of the plurality of global history prediction tables having a greatest total number of unique useful entries in the monitoring period; and generating a prediction for the branch instruction from either of the plurality of global history prediction tables and the floating global history prediction table with the branch predictor of the processor. The method may include updating entries of the plurality of global history prediction tables based on execution of the plurality of instructions, wherein each of the plurality of global history prediction tables have a same number of entries. The method may include updating entries of the plurality of global history prediction tables and the floating global history prediction table based on execution of the plurality of instructions, wherein each entry of a plurality of entries in the floating global history prediction table is a same format as each entry of a plurality of entries of the global history prediction table. The method may include setting a bit in a respective entry of each entry of the plurality of global history prediction tables and each entry of the floating global history prediction table when the respective entry provides a correct prediction which is not available in a global history prediction table of lower history length within the monitoring period. The method may include incrementing a respective counter of the branch predictor for each of the plurality of global history prediction tables when the bit is set for the tracking of the total number of unique entries that provide the correct prediction which is not available in the global history prediction table of lower history length within the monitoring period. The method may include updating a prediction field, a tag, and a useful field of each entry of a plurality of entries in the floating global history prediction table and each entry of a plurality of entries of the global history prediction table. The method may include storing entries evicted from the global history prediction table into the floating global history prediction table that is the extension to the global history prediction table. The method may include wherein the generating comprises reading the floating global history prediction table and the plurality of global history prediction tables in parallel at prediction time.

In yet another embodiment, a non-transitory machine readable medium that stores code that when executed by a machine causes the machine to perform a method including executing a plurality of instructions including a branch instruction with a processor; tracking, for each of a plurality of global history prediction tables of differing history lengths of a branch predictor of the processor, a total number of unique entries that provide a correct prediction which is not available in a global history prediction table of lower history length within a monitoring period that includes execution of a plurality of instances of the branch instruction; assigning a floating global history prediction table of the branch predictor as an extension to a global history prediction table of the plurality of global history prediction tables having a greatest total number of unique useful entries in the monitoring period; and generating a prediction for the branch instruction from either of the plurality of global history prediction tables and the floating global history prediction table with the branch predictor of the processor. The method may include updating entries of the plurality of global history prediction tables based on execution of the plurality of instructions, wherein each of the plurality of global history prediction tables have a same number of entries. The method may include updating entries of the plurality of global history prediction tables and the floating global history prediction table based on execution of the plurality of instructions, wherein each entry of a plurality of entries in the floating global history prediction table is a same format as each entry of a plurality of entries of the global history prediction table. The method may include setting a bit in a respective entry of each entry of the plurality of global history prediction tables and each entry of the floating global history prediction table when the respective entry provides a correct prediction which is not available in a global history prediction table of lower history length within the monitoring period. The method may include incrementing a respective counter of the branch predictor for each of the plurality of global history prediction tables when the bit is set for the tracking of the total number of unique entries that provide the correct prediction which is not available in the global history prediction table of lower history length within the monitoring period. The method may include updating a prediction field, a tag, and a useful field of each entry of a plurality of entries in the floating global history prediction table and each entry of a plurality of entries of the global history prediction table. The method may include storing entries evicted from the global history prediction table into the floating global history prediction table that is the extension to the global history prediction table. The method may include wherein the generating comprises reading the floating global history prediction table and the plurality of global history prediction tables in parallel at prediction time.

In another embodiment, a processor includes an execution unit to execute a branch instruction; and means to generate a prediction for the branch instruction from either of a plurality of global history prediction tables of differing history lengths and a floating global history prediction table, wherein the means is to: for each of the plurality of global history prediction tables, track a total number of unique entries that provide a correct prediction which is not available in a global history prediction table of lower history length within a monitoring period that includes execution of a plurality of instances of the branch instruction, and assign the floating global history prediction table as an extension to a global history prediction table of the plurality of global history prediction tables having a greatest total number of unique useful entries in the monitoring period.

In yet another embodiment, an apparatus comprises a data storage device that stores code that when executed by a hardware processor causes the hardware processor to perform any method disclosed herein. An apparatus may be as described in the detailed description. A method may be as described in the detailed description.

In one embodiment, a TAGE branch predictor has multiple global history prediction (e.g., g-tables) that it queries indexed by the branch IP being predicted, and a certain number of bits (depending on the history length associated with the g-table) from the global history to generate the final prediction. Certain embodiments herein provide a floating g-table as an additional table that is identical in design to the existing g-table design. The floating g-table acts as an extension to the TAGE g-table to which it is assigned in certain embodiments. The dynamic run-time policy decides which TAGE g-table is to be extended with the floating g-table, and when to re-assign the floating g-table to a different TAGE g-table in certain embodiments. Certain embodiments herein refer to the TAGE g-table to which the floating g-table is assigned as the extended TAGE g-table. Note that the identity of the extended TAGE g-table can vary at run-time in certain embodiments. In one embodiment, the floating g-table acts as a victim table to the current extended TAGE g-table, e.g., where only entries evicted from the extended TAGE g-table are allocated in the floating g-table. The floating g-table uses the same index and tag functions as the current extended TAGE g-table in certain embodiments. At prediction time, the floating g-table is read in parallel with the existing TAGE g-tables in certain embodiments. If the lookup in the extended TAGE g-table misses and there is a hit in the floating g-table, the floating g-table entry as an entry belonging to the extended TAGE g-table in certain embodiments. At branch resolution time, the TAGE branch predictor is trained based on the resolved outcome in certain embodiments. The floating g-table is also trained in parallel based on the resolved branch outcome in certain embodiments. If there is an eviction from the extended TAGE g-table, an entry is allocated in the floating g-table at that point in time in certain embodiments.

In one embodiment, the run-time policy of a branch predictor monitors the performance of the different TAGE g-tables to decide which g-table to extend using the floating g-table. The application execution is divided into monitoring periods (e.g., epochs) and the branch predictor (e.g., processor including the branch predictor) is to monitor the performance of the TAGE g-tables across multiple epochs to decide the best performing TAGE g-table in certain embodiments. In one embodiment, an epoch refers to the time taken for the execution of a certain number of conditional branch instructions in the program. In one embodiment, the run-time policy monitors the performance of the TAGE g-tables for a set of monitoring periods (e.g., a set of 'm' epochs) and makes the decision to assign (or reassign) the floating g-table at the end of the monitoring period. In one embodiment, a new monitoring period begins immediately after the completion of the previous monitoring period, so the run-time policy continuously monitors the behavior of the application in certain embodiments. Therefore, the floating g-table is re-assigned, if appropriate, every 'm' epochs in certain embodiments. In one embodiment, the best performing TAGE g-table is based on the number of unique entries in the table which provide a useful prediction during an epoch. In one embodiment, the table with the largest number of unique useful entries is chosen as the best TAGE g-table for that epoch. In certain embodiments, if a TAGE g-table is the best in at least half of the 'm' epochs in a monitoring period, the branch predictor deems that as the most useful TAGE g-table in that monitoring period, and assigns the floating g-table to that TAGE g-table at the end of the monitoring period. Note that it is possible in certain embodiments that no TAGE g-table emerges as the most useful in a given monitoring period. In such cases, it may be desired not to re-assign the floating g-table at the end of the monitoring period.

In certain embodiments, a prediction is useful if it is a correct prediction provided by a table which is not available in any g-table of lower history length. In certain embodiments, a TAGE branch predictor attempts to computes a maximum of two predictions every time it is queried, e.g., a prediction from the highest history length and hitting TAGE g-table, and an alternate prediction from the next highest history length and hitting TAGE g-table. Note that if the query hits in only one TAGE g-table then the alternate prediction is the default bimodal prediction in certain embodiments. Further note that in certain embodiments, if a g-table prediction is available, then an alternate prediction always exists (either from a lower g-table or from the bimodal predictor). Thus, in certain embodiments a TAGE branch predictor determines if the prediction from a TAGE g-table was a useful prediction. In certain embodiments, a g-table prediction is useful only if the prediction was correct and the alternate prediction was incorrect.

Certain embodiments herein use a single bit (e.g., the "useful_in_epoch" bit) in every TAGE g-table entry to monitor the first time a g-table entry provides a useful prediction during the epoch. This bit is reset at the beginning of every epoch, and is set when a TAGE g-table entry provides a useful prediction for the first time during the epoch in certain embodiments. A branch predictor may use these bits to determine the number of unique useful entries belonging to each TAGE g-table in a given epoch. In certain embodiments, the TAGE g-table with the highest number of unique useful entries is deemed the best g-table for that epoch. An instruction set may include a conditional branch instruction.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, May 2018; and see Intel® Architecture Instruction Set Extensions Programming Reference, May 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
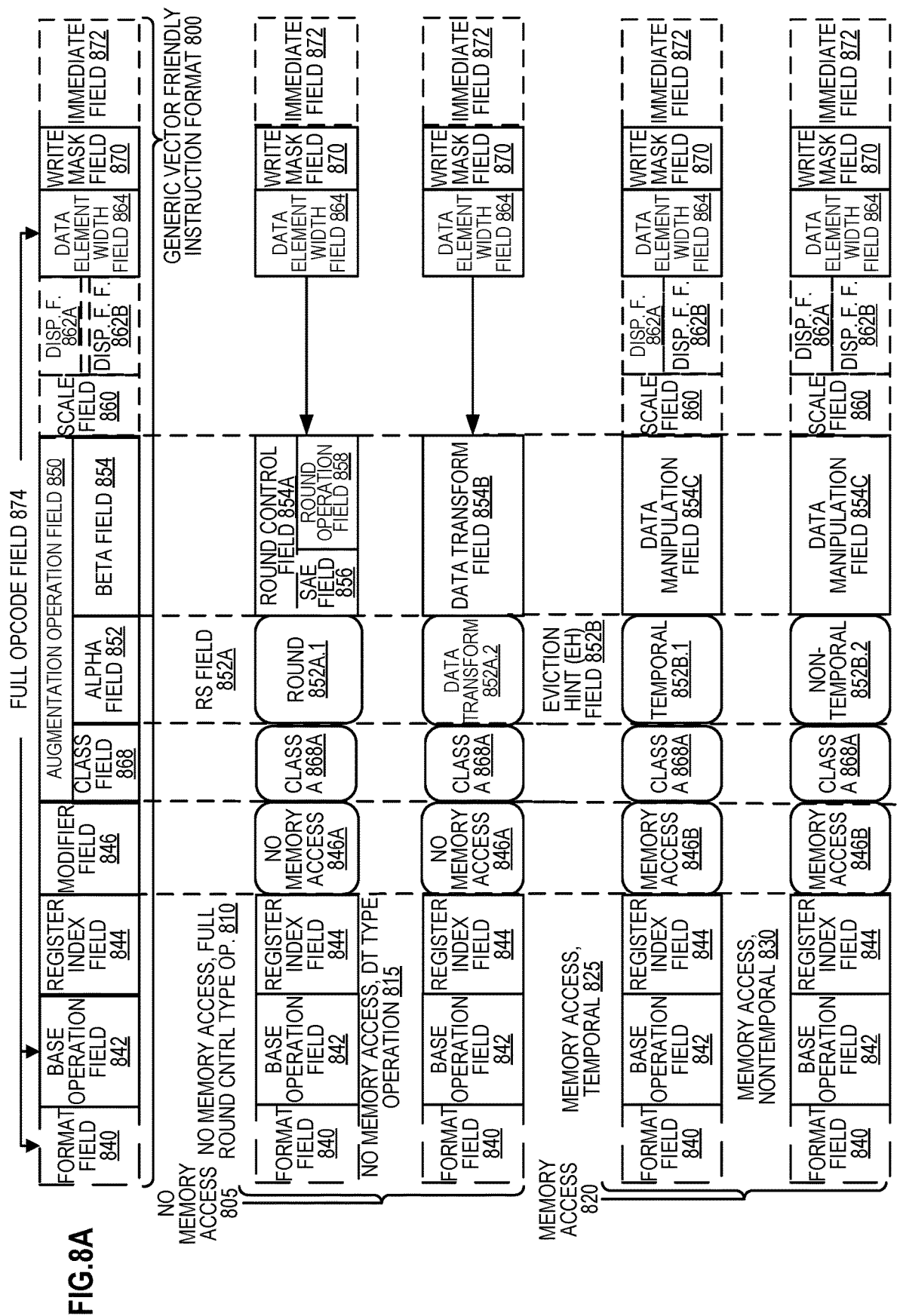
FIG. 8A is a block diagram illustrating a generic vector friendly instruction format and class A instruction templates thereof according to embodiments of the disclosure.
Figure 8B:
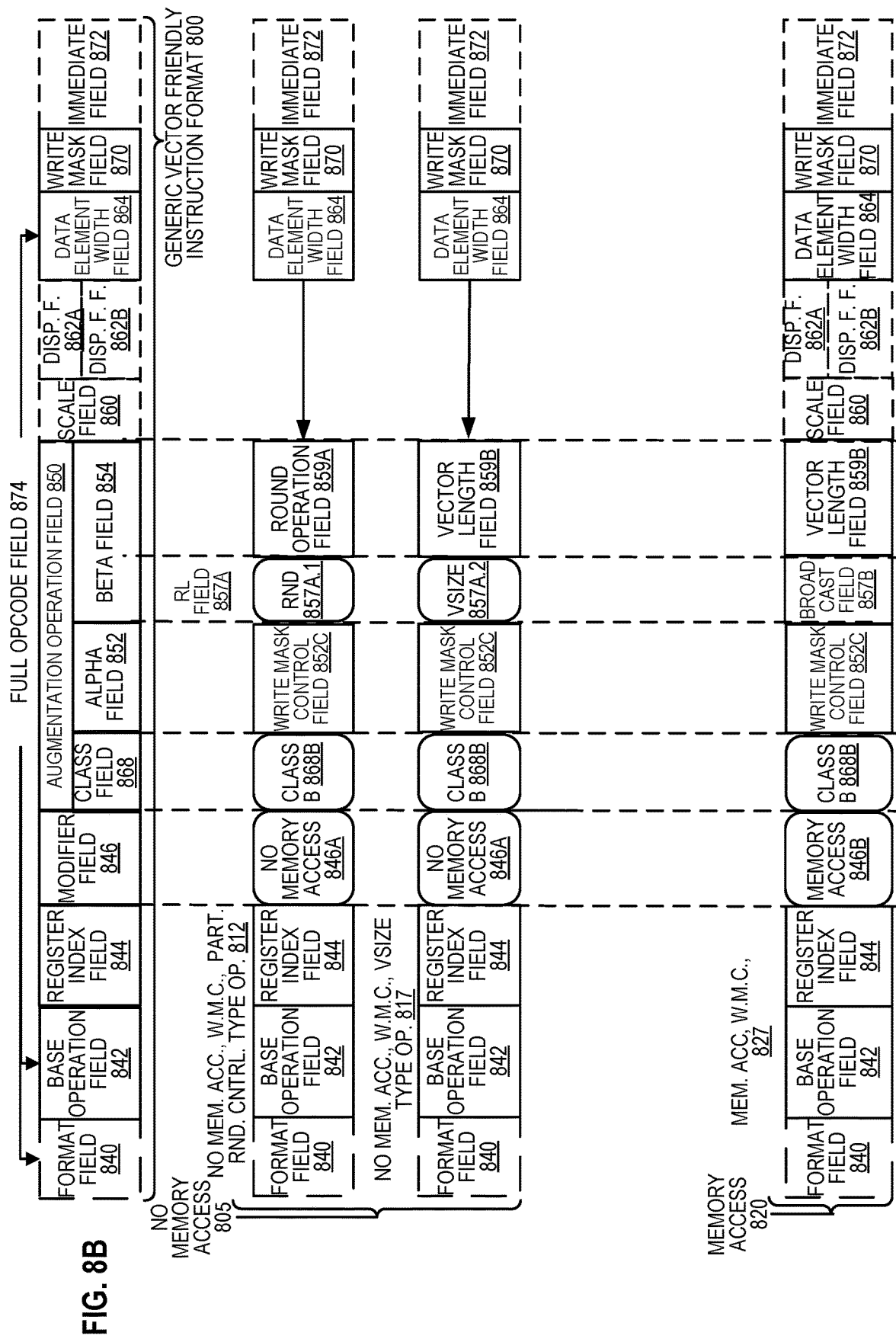
FIG. 8B is a block diagram illustrating the generic vector friendly instruction format and class B instruction templates thereof according to embodiments of the disclosure.

FIGS. 8A-8B are block diagrams illustrating a generic vector friendly instruction format and instruction templates thereof according to embodiments of the disclosure. FIG. 8A is a block diagram illustrating a generic vector friendly instruction format and class A instruction templates thereof according to embodiments of the disclosure; while FIG. 8B is a block diagram illustrating the generic vector friendly instruction format and class B instruction templates thereof according to embodiments of the disclosure. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the disclosure, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}*index+base$).

Displacement Field 862A—its content is used as part of memory address generation (e.g., for address generation that uses $2^{scale}*index+base+displacement$).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the disclosure are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the disclosure the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the disclosure where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the disclosure where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9 is a block diagram illustrating an exemplary specific vector friendly instruction format according to embodiments of the disclosure. FIG. 9 shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9 map are illustrated.

It should be understood that, although embodiments of the disclosure are described with reference to the specific vector friendly instruction format 900 in the context of the generic vector friendly instruction format 800 for illustrative purposes, the disclosure is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the disclosure is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one embodiment of the disclosure).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]—R), EVEX.X bit field (EVEX byte 1, bit [6]—X), and 857BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (OF, OF 38, or OF 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]—U)—If EVEX.U=0, it indicates class A or EVEX.U0; if EVEX.U=1, it indicates class B or EVEX.U1.

Prefix encoding field 925 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]—kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one embodiment of the disclosure. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the disclosure. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
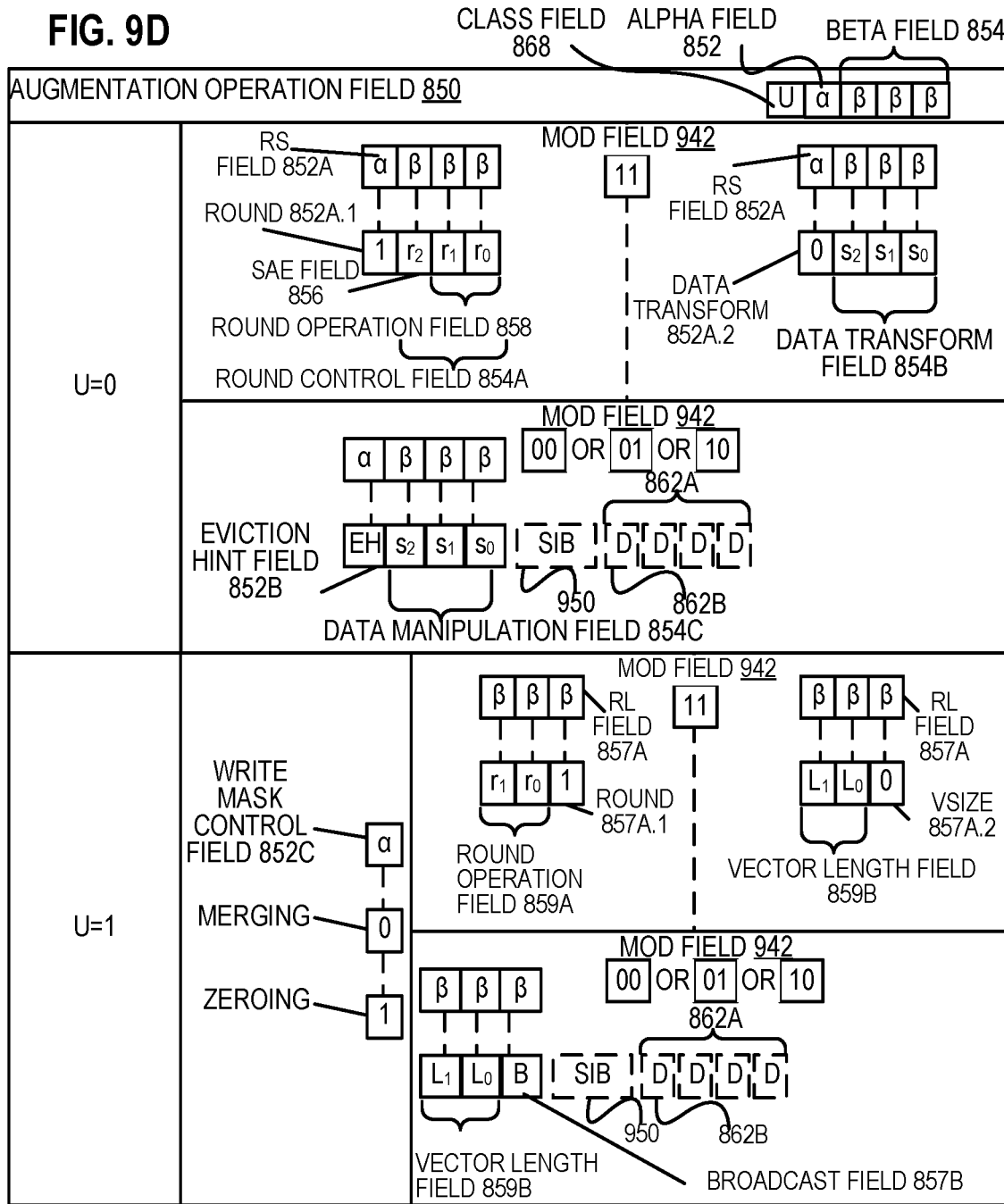
FIG. 9D is a block diagram illustrating the fields of the specific vector friendly instruction format in FIG. 9A that make up the augmentation operation field 850 according to one embodiment of the disclosure.

FIG. 9D is a block diagram illustrating the fields of the specific vector friendly instruction format 900 that make up the augmentation operation field 850 according to one embodiment of the disclosure. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 854B. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 852C. When U=1 and the MOD field 942 contains 11 (signifying a no memory access operation), part of the beta field 854 (EVEX byte 3, bit [4]—S$_0$) is interpreted as the RL field 857A; when it contains a 1 (round 857A.1) the rest of the beta field 854 (EVEX byte 3, bit [6-5]—S$_{2-1}$) is interpreted as the round operation field 859A, while when the RL field 857A contains a 0 (VSIZE 857.A2) the rest of the beta field 854 (EVEX byte 3, bit [6-5]—S$_{2-1}$) is interpreted as the vector length field 859B (EVEX byte 3, bit [6-5]—L$_{1-0}$). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—L$_{1-0}$) and the broadcast field 857B (EVEX byte 3, bit [4]—B).

Exemplary Register Architecture

Figure 10:
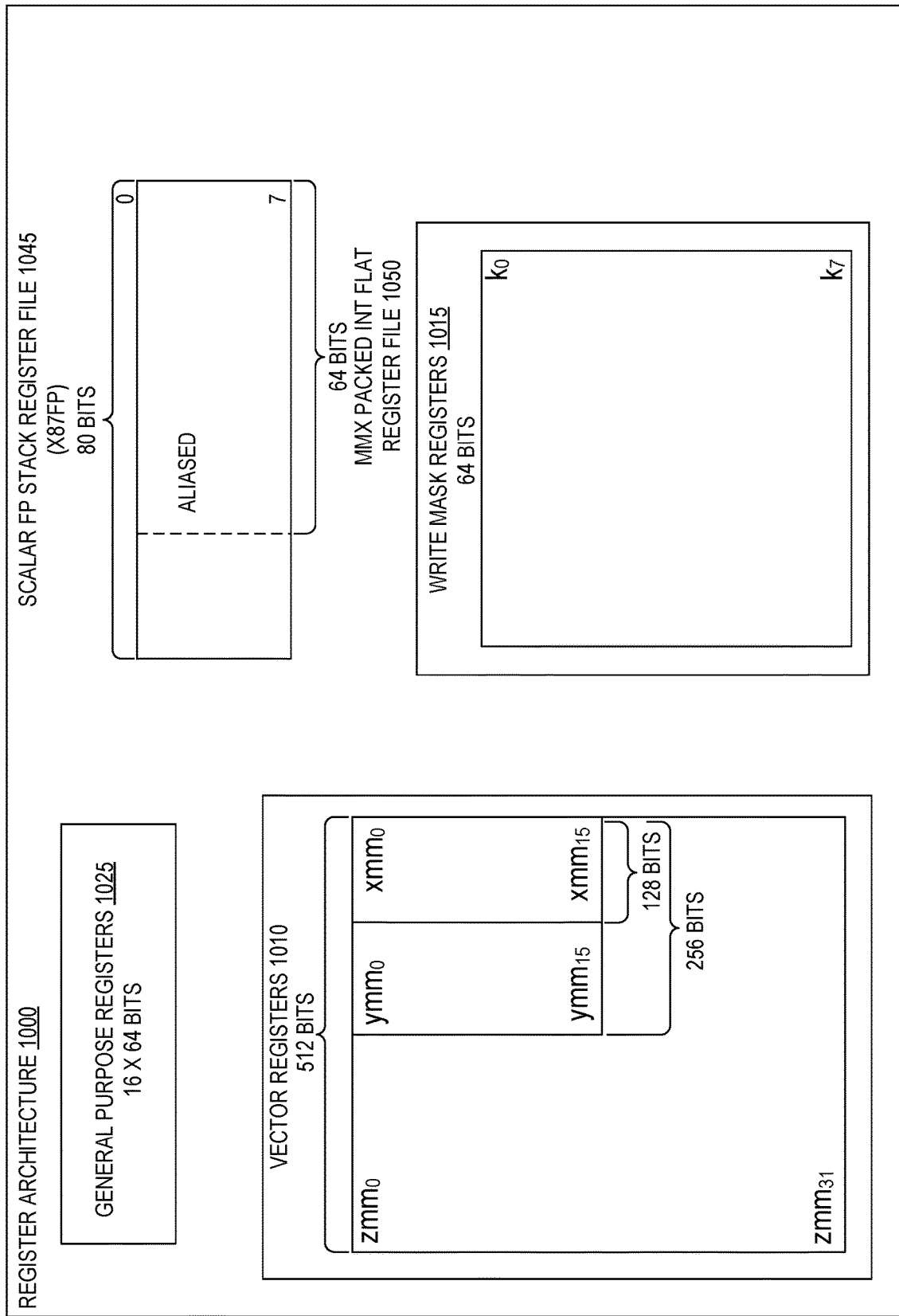
FIG. 10 is a block diagram of a register architecture according to one embodiment of the disclosure

FIG. 10 is a block diagram of a register architecture 1000 according to one embodiment of the disclosure. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 11A is a block diagram illustrating both an exemplary in-order pipeline and an exemplary register renaming, out-of-order issue/execution pipeline according to embodiments of the disclosure. FIG. 11B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macro-instructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
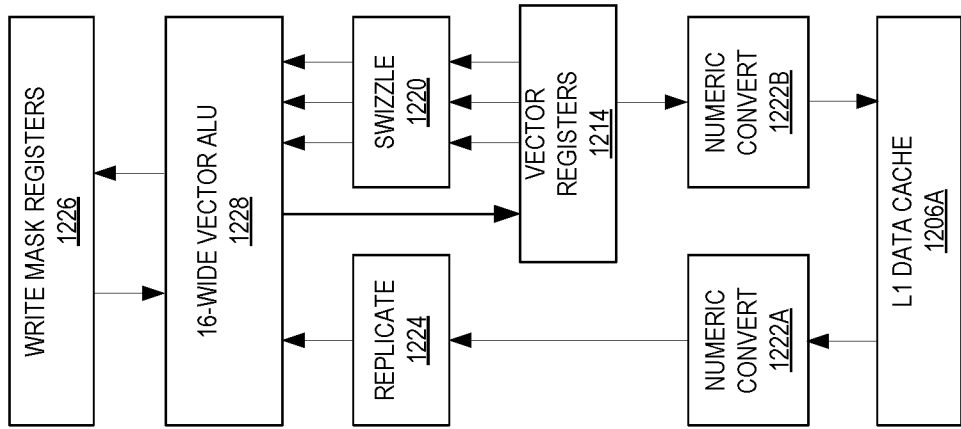
FIG. 12B is an expanded view of part of the processor core in FIG. 12A according to embodiments of the disclosure.
Figure 12A:
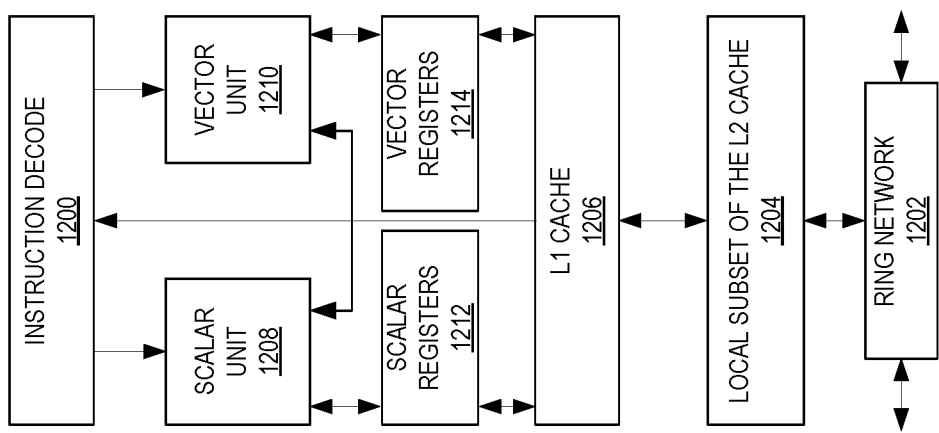
FIG. 12A is a block diagram of a single processor core, along with its connection to the on-die interconnect network and with its local subset of the Level 2 (L2) cache, according to embodiments of the disclosure.

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the disclosure. In one embodiment, an instruction decode unit 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the disclosure may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the disclosure. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
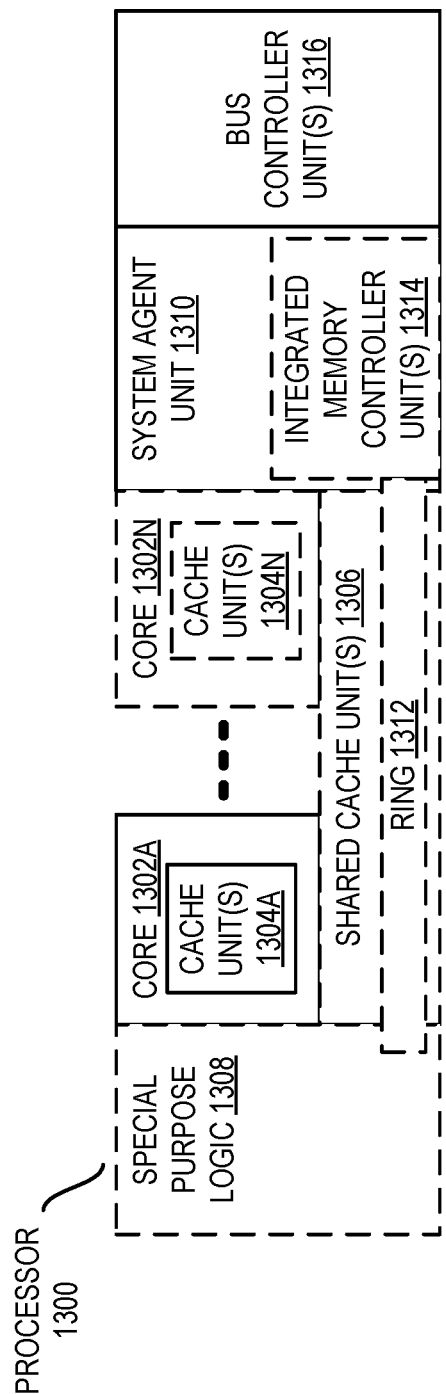
FIG. 13 is a block diagram of a processor that may have more than one core, may have an integrated memory controller, and may have integrated graphics according to embodiments of the disclosure.

FIG. 13 is a block diagram of a processor 1300 that may have more than one core, may have an integrated memory controller, and may have integrated graphics according to embodiments of the disclosure. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
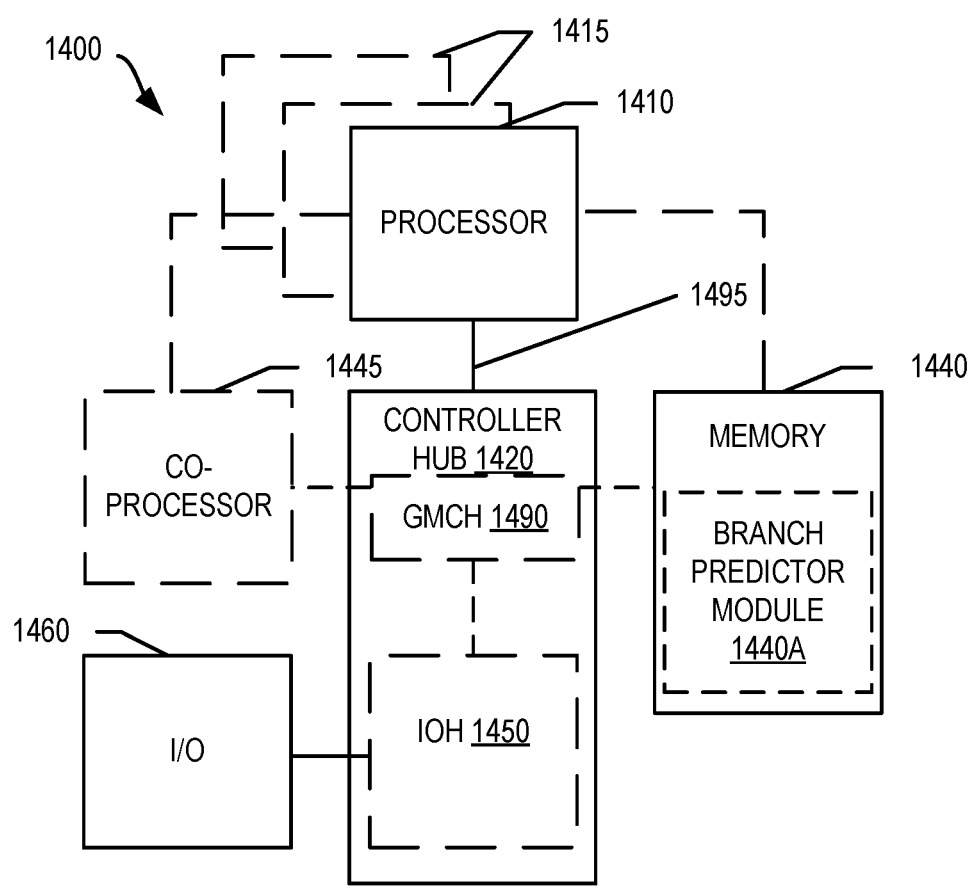
FIG. 14 is a block diagram of a system in accordance with one embodiment of the present disclosure.

Referring now to FIG. 14, shown is a block diagram of a system 1400 in accordance with one embodiment of the present disclosure. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450. Memory 1440 may include a branch predictor module 1440A, for example, to store code that when executed causes a processor to perform any method of this disclosure.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as Quickpath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
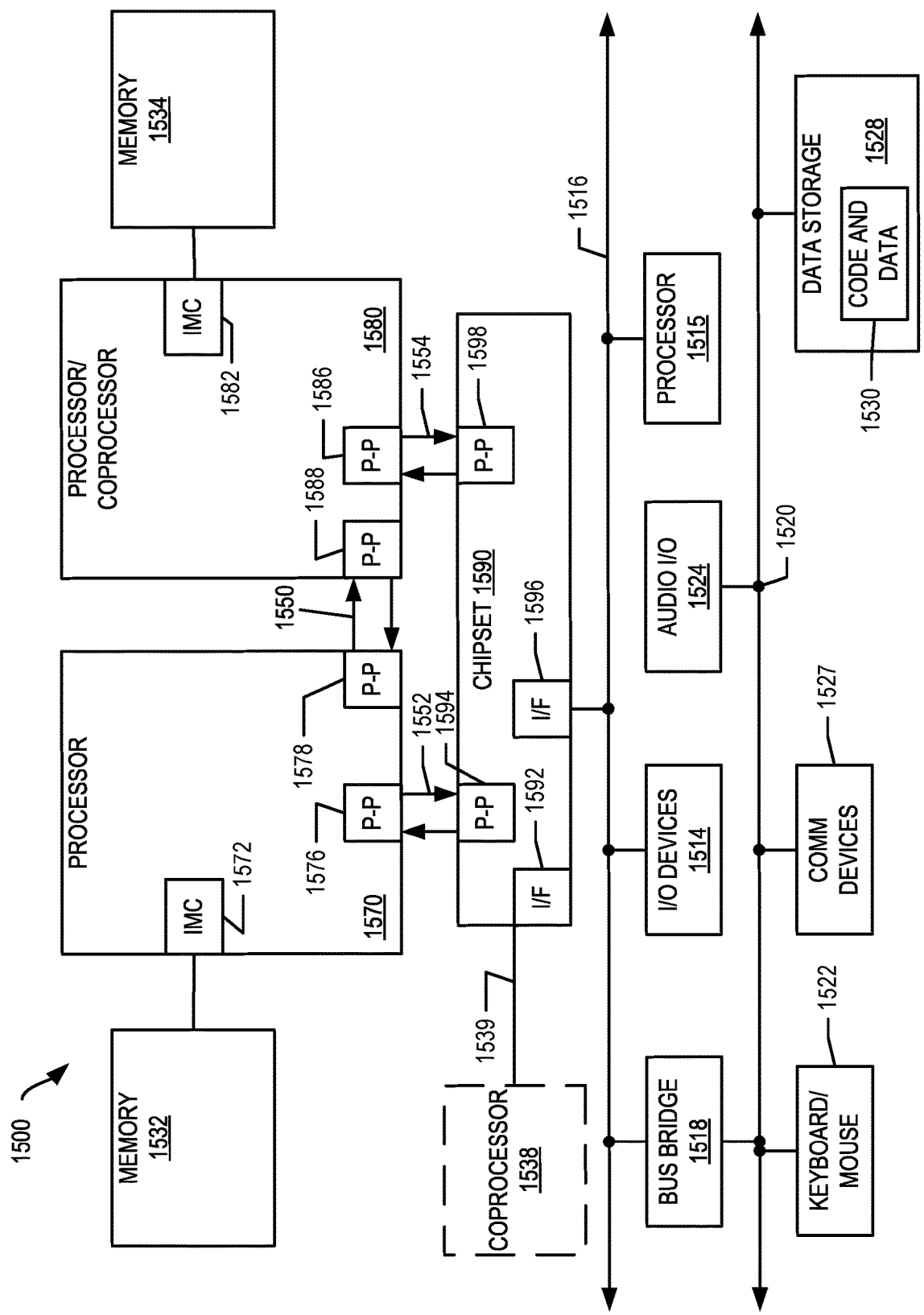
FIG. 15 is a block diagram of a more specific exemplary system in accordance with an embodiment of the present disclosure.

Referring now to FIG. 15, shown is a block diagram of a first more specific exemplary system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550.

Each of processors 1570 and 1580 may be some version of the processor 1300. In one embodiment of the disclosure, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
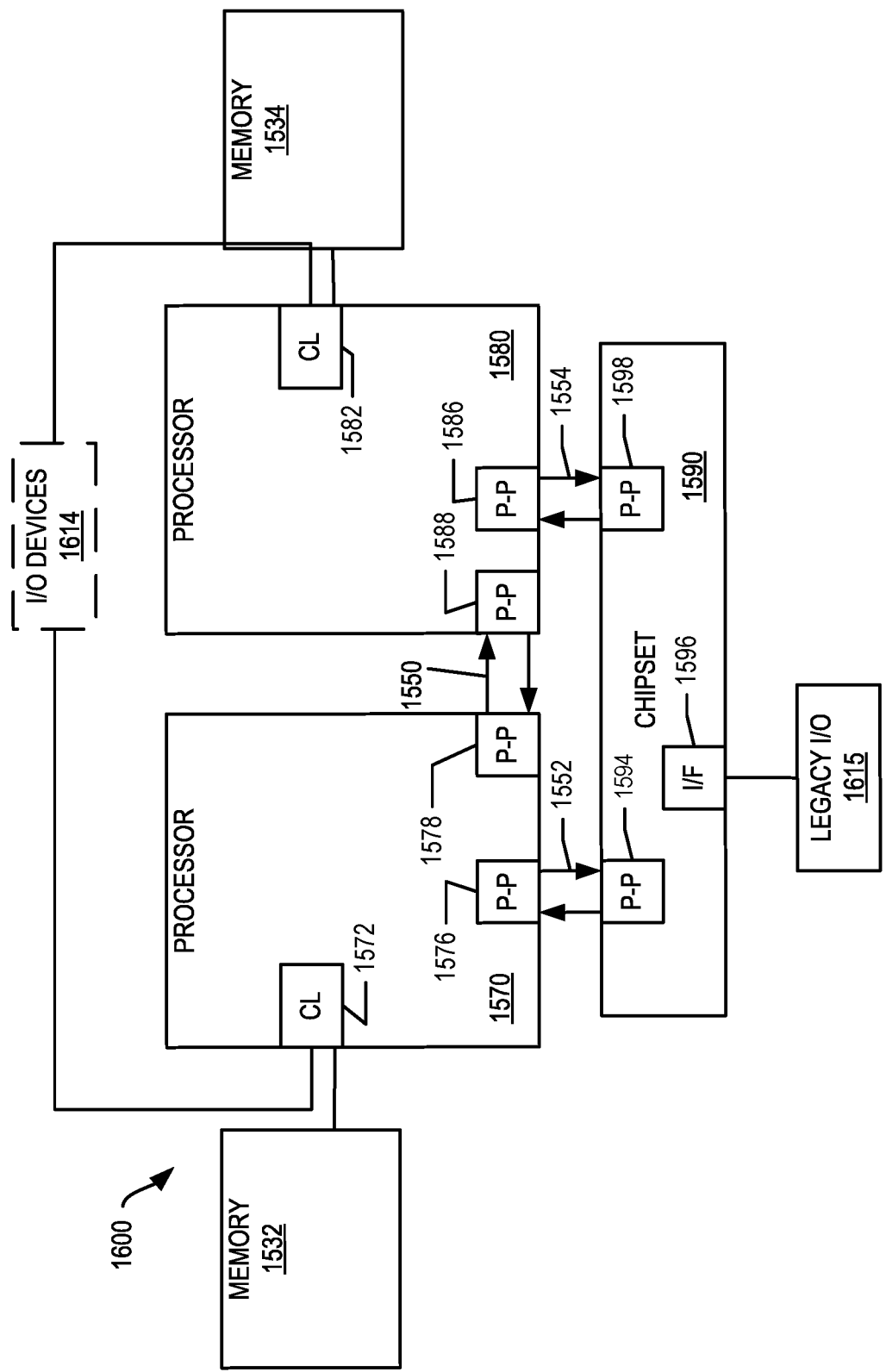
FIG. 16, shown is a block diagram of a second more specific exemplary system in accordance with an embodiment of the present disclosure.

Referring now to FIG. 16, shown is a block diagram of a second more specific exemplary system 1600 in accordance with an embodiment of the present disclosure Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
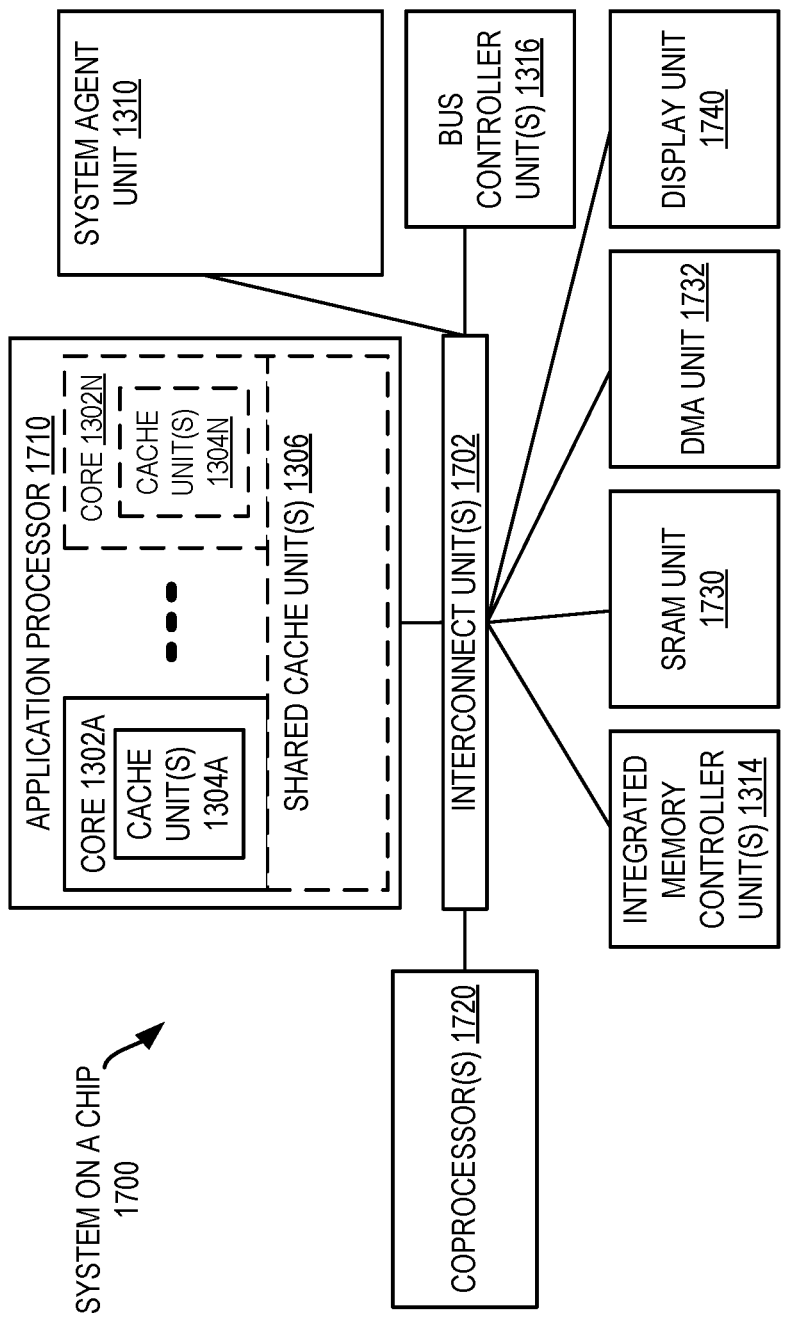
FIG. 17, shown is a block diagram of a system on a chip (SoC) in accordance with an embodiment of the present disclosure.

Referring now to FIG. 17, shown is a block diagram of a SoC 1700 in accordance with an embodiment of the present disclosure. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 202A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
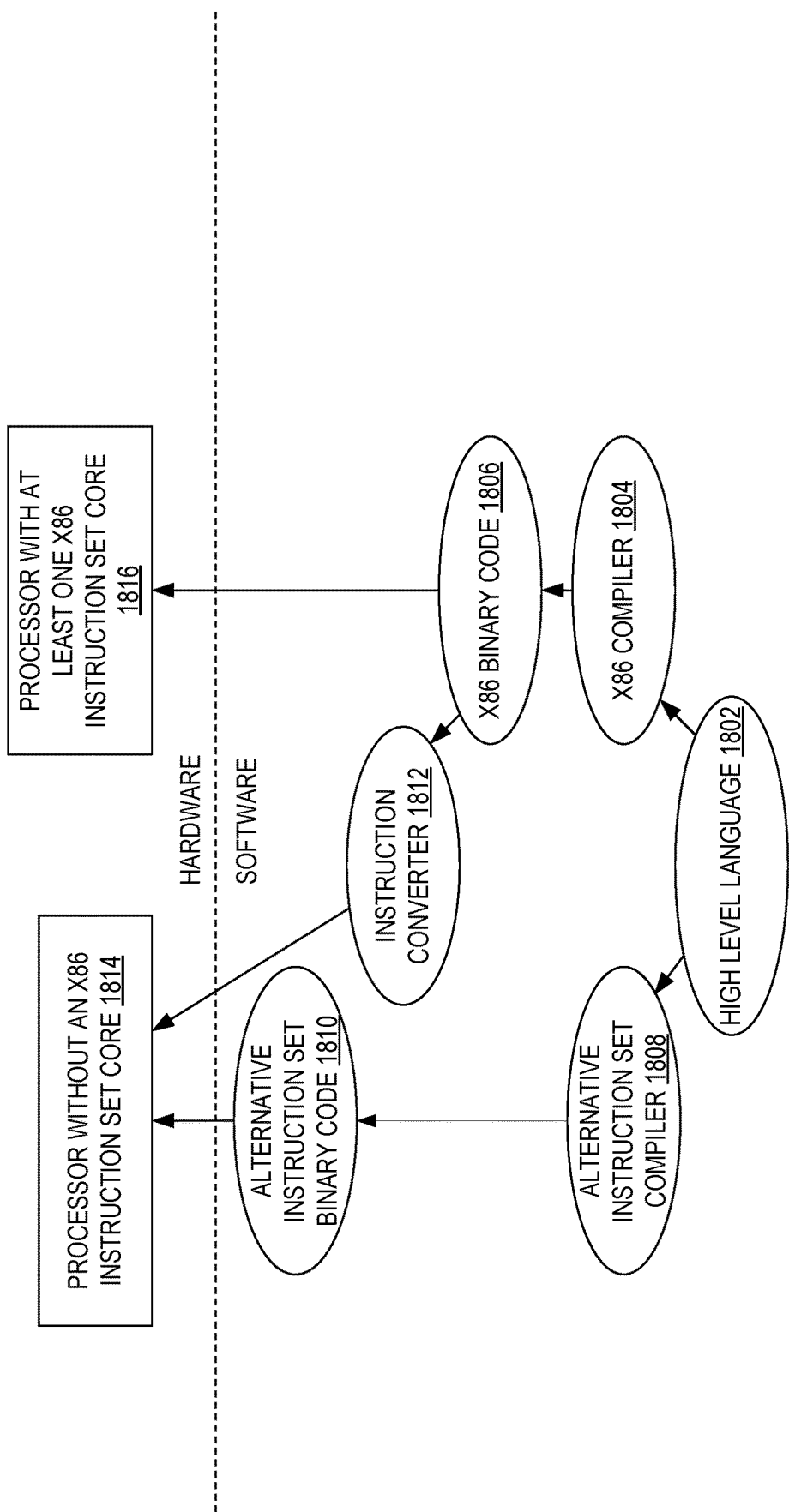
FIG. 18 is a block diagram contrasting the use of a software instruction converter to convert binary instructions in a source instruction set to binary instructions in a target instruction set according to embodiments of the disclosure.

FIG. 18 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

What is claimed is:

1. A processor comprising:
   an execution unit to execute a branch instruction; and
   a branch predictor to generate a prediction for the branch instruction from either of a plurality of global history prediction tables of differing history lengths and a floating global history prediction table, wherein the branch predictor is to:
      for each of the plurality of global history prediction tables, track a total number of unique entries that provide a correct prediction which is not available in a global history prediction table of lower history length within a monitoring period that includes execution of a plurality of instances of the branch instruction, and
      assign the floating global history prediction table as an extension to a global history prediction table of the plurality of global history prediction tables having a greatest total number of unique useful entries in the monitoring period.

2. The processor of claim 1, wherein each of the plurality of global history prediction tables have a same number of entries.

3. The processor of claim 1, wherein each entry of a plurality of entries in the floating global history prediction table is a same format as each entry of a plurality of entries of the global history prediction table.

4. The processor of claim 1, wherein each entry of the plurality of global history prediction tables and each entry of the floating global history prediction table includes a field to store a bit set by the branch predictor when a respective entry provides a correct prediction which is not available in a global history prediction table of lower history length within the monitoring period.

5. The processor of claim 4, wherein the branch predictor increments a respective counter for each of the plurality of global history prediction tables when the bit is set to track the total number of unique entries that provide the correct prediction which is not available in the global history prediction table of lower history length within the monitoring period.

6. The processor of claim 5, wherein each entry of a plurality of entries in the floating global history prediction table and each entry of a plurality of entries of the global history prediction table includes a prediction field, a tag, and a useful field.

7. The processor of claim 1, wherein the branch predictor stores entries evicted from the global history prediction table into the floating global history prediction table that is the extension to the global history prediction table.

8. The processor of claim 1, wherein the branch predictor reads the floating global history prediction table and the plurality of global history prediction tables in parallel at prediction time.

9. A method comprising:
   executing a plurality of instructions including a branch instruction with a processor;
   tracking, for each of a plurality of global history prediction tables of differing history lengths of a branch predictor of the processor, a total number of unique entries that provide a correct prediction which is not available in a global history prediction table of lower history length within a monitoring period that includes execution of a plurality of instances of the branch instruction;
   assigning a floating global history prediction table of the branch predictor as an extension to a global history prediction table of the plurality of global history prediction tables having a greatest total number of unique useful entries in the monitoring period; and
   generating a prediction for the branch instruction from either of the plurality of global history prediction tables and the floating global history prediction table with the branch predictor of the processor.

10. The method of claim 9, further comprising updating entries of the plurality of global history prediction tables based on execution of the plurality of instructions, wherein each of the plurality of global history prediction tables have a same number of entries.

11. The method of claim 9, further comprising updating entries of the plurality of global history prediction tables and the floating global history prediction table based on execution of the plurality of instructions, wherein each entry of a plurality of entries in the floating global history prediction table is a same format as each entry of a plurality of entries of the global history prediction table.

12. The method of claim 9, further comprising setting a bit in a respective entry of each entry of the plurality of global history prediction tables and each entry of the floating global history prediction table when the respective entry provides a correct prediction which is not available in a global history prediction table of lower history length within the monitoring period.

13. The method of claim 12, further comprising incrementing a respective counter of the branch predictor for each of the plurality of global history prediction tables when the bit is set for the tracking of the total number of unique entries that provide the correct prediction which is not available in the global history prediction table of lower history length within the monitoring period.

14. The method of claim 13, further comprising updating a prediction field, a tag, and a useful field of each entry of a plurality of entries in the floating global history prediction table and each entry of a plurality of entries of the global history prediction table.

15. The method of claim 9, further comprising storing entries evicted from the global history prediction table into the floating global history prediction table that is the extension to the global history prediction table.

16. The method of claim 9, wherein the generating comprises reading the floating global history prediction table and the plurality of global history prediction tables in parallel at prediction time.

17. A non-transitory machine readable medium that stores code that when executed by a machine causes the machine to perform a method comprising:
    executing a plurality of instructions including a branch instruction with a processor;
    tracking, for each of a plurality of global history prediction tables of differing history lengths of a branch predictor of the processor, a total number of unique entries that provide a correct prediction which is not available in a global history prediction table of lower history length within a monitoring period that includes execution of a plurality of instances of the branch instruction;
    assigning a floating global history prediction table of the branch predictor as an extension to a global history prediction table of the plurality of global history prediction tables having a greatest total number of unique useful entries in the monitoring period; and
    generating a prediction for the branch instruction from either of the plurality of global history prediction tables and the floating global history prediction table with the branch predictor of the processor.

18. The non-transitory machine readable medium of claim 17, further comprising updating entries of the plurality of global history prediction tables based on execution of the plurality of instructions, wherein each of the plurality of global history prediction tables have a same number of entries.

19. The non-transitory machine readable medium of claim 17, further comprising updating entries of the plurality of global history prediction tables and the floating global history prediction table based on execution of the plurality of instructions, wherein each entry of a plurality of entries in the floating global history prediction table is a same format as each entry of a plurality of entries of the global history prediction table.

20. The non-transitory machine readable medium of claim 17, further comprising setting a bit in a respective entry of each entry of the plurality of global history prediction tables and each entry of the floating global history prediction table when the respective entry provides a correct prediction which is not available in a global history prediction table of lower history length within the monitoring period.

21. The non-transitory machine readable medium of claim 20, further comprising incrementing a respective counter of the branch predictor for each of the plurality of global history prediction tables when the bit is set for the tracking of the total number of unique entries that provide the correct prediction which is not available in the global history prediction table of lower history length within the monitoring period.

22. The non-transitory machine readable medium of claim 21, further comprising updating a prediction field, a tag, and a useful field of each entry of a plurality of entries in the floating global history prediction table and each entry of a plurality of entries of the global history prediction table.

23. The non-transitory machine readable medium of claim 17, further comprising storing entries evicted from the global history prediction table into the floating global history prediction table that is the extension to the global history prediction table.

24. The non-transitory machine readable medium of claim 17, wherein the generating comprises reading the floating global history prediction table and the plurality of global history prediction tables in parallel at prediction time.

* * * * *